(12) United States Patent
Macura et al.

(10) Patent No.: US 7,979,256 B2
(45) Date of Patent: Jul. 12, 2011

(54) DETERMINING ABSORBENT ARTICLE EFFECTIVENESS

(75) Inventors: Matthew Joseph Macura, Cincinnati, OH (US); Paul Martin Lipic, West Chester, OH (US); Mel Allende-Blanco, Loveland, OH (US); James Kenneth Comer, Jr., West Chester, OH (US); Douglas Gregory Stevens, Cincinnati, OH (US); Bruce William Lavash, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 878 days.

(21) Appl. No.: 11/699,880

(22) Filed: Jan. 30, 2007

(65) Prior Publication Data

US 2008/0183450 A1 Jul. 31, 2008

(51) Int. Cl.
*G06F 17/10* (2006.01)
*G06F 17/11* (2006.01)
*G06F 17/12* (2006.01)
*G06G 7/48* (2006.01)
*G06G 7/50* (2006.01)
*G06G 7/57* (2006.01)
*A61M 1/00* (2006.01)

(52) U.S. Cl. ............... 703/9; 703/2; 703/6; 604/317
(58) Field of Classification Search ............ 703/6, 2, 703/9; 604/317
See application file for complete search history.

(56) References Cited

U.S. PATENT DOCUMENTS

| | | | |
|---|---|---|---|
| 5,495,568 A | 2/1996 | Beavin | |
| 5,625,577 A | 4/1997 | Kunii | |
| 5,647,863 A * | 7/1997 | Hammons et al. | 604/378 |
| 6,005,959 A | 12/1999 | Mohan et al. | |
| 6,310,619 B1 | 10/2001 | Rice | |
| 6,310,627 B1 | 10/2001 | Sakaguchi | |
| 6,310,964 B1 | 10/2001 | Mohan et al. | |
| 6,377,865 B1 | 4/2002 | Edelsbrunner | |
| 6,404,426 B1 | 6/2002 | Weaver | |
| 6,430,993 B1 | 8/2002 | Seta | |

(Continued)

FOREIGN PATENT DOCUMENTS

EP 2048488 A1 4/2009

(Continued)

OTHER PUBLICATIONS

Azar, Fred S., "A Deformable Finite Element Model of the Breast for Predicting Mechanical Deformations under External Perturbations," 2001, pp. 965-975.

(Continued)

*Primary Examiner* — David Silver
*Assistant Examiner* — Suzanne Lo
(74) *Attorney, Agent, or Firm* — Megan C. Hymore; James E. Oehlenschlager; Andrew J. Hagerty

(57) ABSTRACT

A method for determining absorbent article effectiveness of a virtual absorbent article. The steps of the method include providing a virtual body model, providing a virtual absorbent article model, providing virtual simulation software, running a virtual simulation of deformation of the virtual absorbent article model in proximity with the virtual body model, running a virtual simulation of the fluid balance of the virtual absorbent article model in proximity with the virtual body model, coupling the virtual simulation of deformation of the virtual absorbent article model and the virtual simulation of the fluid balance of the virtual absorbent article model, and determining absorbent article effectiveness of the virtual absorbent article model in proximity with the virtual body model.

20 Claims, 10 Drawing Sheets

U.S. PATENT DOCUMENTS

| | | | |
|---|---|---|---|
| 6,434,257 | B1 | 8/2002 | Mohan et al. |
| 6,530,065 | B1 | 3/2003 | McDonald et al. |
| 6,691,566 | B2 | 2/2004 | Iwasaki et al. |
| 6,695,770 | B1 | 2/2004 | Choy et al. |
| 6,810,300 | B1 | 10/2004 | Woltman et al. |
| 6,904,820 | B2* | 6/2005 | Tate et al. ............... 73/866 |
| 6,909,431 | B1 | 6/2005 | Anderson et al. |
| 6,938,022 | B1 | 8/2005 | Singhal |
| 6,982,710 | B2 | 1/2006 | Salomie |
| 7,099,734 | B2 | 8/2006 | Pieper et al. |
| 7,373,284 | B2 | 5/2008 | Stabelfeldt et al. |
| 7,684,939 | B2 | 3/2010 | Allende-Blanco et al. |
| 2001/0026272 | A1 | 10/2001 | Feld |
| 2002/0050317 | A1 | 5/2002 | Iwasaki et al. |
| 2003/0023156 | A1 | 1/2003 | Pappas et al. |
| 2003/0052875 | A1 | 3/2003 | Salomie |
| 2003/0067496 | A1 | 4/2003 | Tasker et al. |
| 2003/0215130 | A1 | 11/2003 | Nakamura et al. |
| 2004/0236455 | A1 | 11/2004 | Woltman et al. |
| 2004/0236456 | A1 | 11/2004 | Pieper et al. |
| 2004/0236457 | A1 | 11/2004 | Stabelfeldt et al. |
| 2004/0236552 | A1 | 11/2004 | Pieper et al. |
| 2005/0256686 | A1* | 11/2005 | Stabelfeldt et al. ............... 703/6 |
| 2005/0264561 | A1* | 12/2005 | Anast et al. ............... 345/420 |
| 2005/0264562 | A1 | 12/2005 | Macura et al. |
| 2005/0264563 | A1 | 12/2005 | Macura et al. |
| 2005/0264572 | A1 | 12/2005 | Anast et al. |
| 2005/0267613 | A1 | 12/2005 | Anast et al. |
| 2005/0267614 | A1* | 12/2005 | Looney et al. ............... 700/98 |
| 2005/0267615 | A1 | 12/2005 | Lavash et al. |
| 2006/0004663 | A1 | 1/2006 | Singhal |
| 2006/0290695 | A1 | 12/2006 | Salomie |
| 2008/0046189 | A1 | 3/2008 | Allende-Blanco et al. |
| 2008/0140368 | A1* | 6/2008 | Gilbert et al. ............... 703/9 |

FOREIGN PATENT DOCUMENTS

| | | |
|---|---|---|
| EP | 2224362 A1 | 1/2010 |
| GB | 2 389 500 A | 12/2003 |
| WO | WO 01/35342 A1 | 5/2001 |
| WO | WO 02/29758 A2 | 4/2002 |

OTHER PUBLICATIONS

Baraff, David and Witkin, Andrew: "Large Steps in Cloth Simulation," Robotics Institute, Carnegie Mellon University, SIGGRAPH 98, Orlando, Jul. 19-24, Computer Graphics Proceedings, Annual Conference Series, 1998, pp. 43-54.

Baraff, David, "Partitioned Dynamics," The Robotics Institute, Mar. 1997, pp. 1-14.

Bosboom, E.M.H.; Hesselink, M.K.C.; Oomens, C.W..; Bouten, C.V. C.; Drost, M.R.; Baaijens, F.P.T., "Passive Transverse Mechanical Properties of Skeletal Muscle Under in Vivo Compression," Journal of Biomechanics 34 (2001), pp. 1365-1368.

Breen, David E., "A Particle-Based Model for Simulating the Draping Behavior of Woven Cloth," ECRC-94-19, pp. 1-35, 1994.

Breen, David E., "Predicting the Drape of Woven Cloth Using Interacting Particles," ECRC-94-16, pp. 1-19, 1994.

Brown, J. et al., "Real-Time Simulation of Deformable Objects: Tools and Application", Computer Animation, 2001, The Fourteenth Conference on Computer Animation, Proceedings Nov. 7-8, 2001, Piscataway, NJ, USA, IEEE, pp. 228-236.

Cordier, F et al.: "Made-to-measure technologies for an online clothing store" IEEE Computer Graphics and Applications, IEEE, New York, NY, US, vol. 23, No. 1, Jan. 2003, pp. 38-48, XP011095449, ISSN: 0272-1716, the whole document.

"Diapers: Better by Design with CFD" 'Online! 2000, XP002293841 Retrieved from the Internet: URL:http://www.hikeytech.com/newsletters/n1208.pdf> 'retrieved on Aug. 25, 2004! The whole document. pp. 1-2.

Dong, L. et al: "Solid-Mechanics Finite Element Simulations of the Draping of Fabrics: A Sensitivity Analysis" Composites Part A: Applied Science and Manufacturing, Elsevier Science Publishers B.V., Amsterdam, NL, vol. 31, No. 7 Jul. 2000, pp. 639-652 XP004203509, ISSN: 1359-835X.

Eischen, J.W. et al.: "Finite-Element Modeling and Control of Flexible Fabric Parts" IEEE Computer Graphics and Applications, IEEE Inc., New York, US, vol. 16, No. 5, Sep. 1996, pp. 71-80.

Gladillin, Evgeny; Ivanov, A.; Roginsky, V.: "Implant Shape Optimization Using Reverse FEA," Moscow Center of Children's Maxillofacial Surgery Timura Frunse 16, 119992 Moscow, Russia, pp. 200-207, 2006

Goonetilleke Ravindra S. et al.: "The Quality of Footwear Fit: What we know, don't know and should know", Proc. Triennial Congr. Internat. Ergon. Assoc. Ann. Meeting Human Factors Ergon. Assoc.; Proceedings of the XIVth Triennial Congress of the International Ergonomics Association and 44$^{th}$ Annual Meeting of the Human Factors and Ergonomics Association, 'ER, 2000, pp. 515-518.

Hadap, S. et al.: Institute of Electrical and Electronics Engineers: "Animated Wrinkles on Clothes: Proceedings Visualization '99." VIS '99. San Francisco, CA, Oct. 24-29, 1999, Annual IEEE Conference on Visualization, Los Almitos, CA: IEEE Comp. Soc, US, Oct. 24, 1999, pp. 175-182, XP000895693, ISBN: 0-7803-5899-6, the whole document.

Haridas, B.; Hong, H.; Minoguchi, R., Owens, S.; Osborn, T.: "PelvicSim-A Computational-Experimental System for Biomechanical Evaluation of Female Pelvic Floor Organ Disorders and Associated Minimally Invasive Interventions, " Medicine Meets Virtual Reading 14, IOS Press 2006, pp. 182-187.

Herda, L. et al., "Skeleton-Based Motion Capture for Robust Reconstruction of Human Motion", Computer Animation 2000. Proceedings May 3-5, 2000, Piscataway, NJ, USA, IEEE, pp. 77-83, ISBN: 0-7695-0683-6.

Hoff, K.E., et al., Association for Computering Machinery, "Fast and Simple 2D Geometric Proximity Queries Using Graphics Hardware", Proceedings of the 2001 Symposium on Interactive 3D Graphics, Research Triangle Park, NC, Mar. 19-21, 2001, pp. 145-148.

House, Donald H., "Towards Simulating Cloth Dynamics Using Interacting Particles," ECRC Feb. 7, 1996. pp. 1-21.

Kauer, M.; Vuskovic, V.; Dual, J.; Szekely, G.; Bajka, M.: "Inverse Finite Element Characterization of Soft Tissue," Medical Image Analysis 6 (2002), pp. 275-287.

Li Y et al: "A 3D Biomechanical Model for Numerical Simulation of Dynamic Mechanical Interactions of Bra and Breast During Wear", SEN'I GAKKAISHI 2003, vol. 59, No. 1, pp. 12-21.

Magnenat-Thalmann N et al., "Avenues of Research in Dynamic Clothing", Computer Animation, 2002, Proceedings of Jun. 19-21, 2002, Piscataway, NJ, USA, IEEE, pp. 193-202.

Mansson, J., and Soderqvist, J.: "Finite Element Analysis of Thin Membrane Wrinkling" Online! Mar. 2003, XP002339958, Technical Reports from Royal Institute of Technology Department of Mechanics Retrieved from the Internet: URL:http://www2.mech.kth.se/{ gunnart/MScThesisJohan&Johan?MedRes.pdf>.

Muthu-Sageren, L.; Torosln, R.; Parnew, L.; Suca, S.: "A Three-Dimensional Model of the Mandible Using Two-Dimensional CT Images," 2001 Proceedings of the 23rd Annual EMBS International Conference, Oct. 25-28, Istanbul, Turkey, pp. 2778-2781.

Oomens, C. W. J., Deformation Analysis of a Supported Buttock Contact, BED-vol. 50, 2001. pp. 853-854.

Rossignac, J. et al., "Interactive Inspection of Solids: Cross-Sections and Interferences", Computer Graphics USA, vol. 26, No. 2, Jul. 1992, pp. 353-360.

Saha, D. et al: "Web-based distributed VLSI design" VLSI Design, 1998. Proceedings., 1998 Eleventh International Conference on Chennai, India Jan. 4-7, 1998, Los Alamitos, CA, USA, IEEE Compt. Soc, US, Jan. 4, 1998, pp. 449-454, XP010263475, ISBN: 0-8186-8224-8, the whole document.

Solzbach, U., et al., "Densitometric Determination of Absolute Cross-Section Areas of Coronary Arteries", Proceedings of the Computers in Cardiology Meeting, Chicago, Sep. 23, 1990, pp. 9-11.

Volino, P. et al.: From early virtual garment simulation to interactive fashion design: Computer Aided Design, Elsevier Publishers BV., Barking, GB, vol. 37. No. 6, May 2005, pp. 593-608, XP004750045, ISSN: 0010-4485, the whole document.

Volino, Pascal, Versatile and Efficient Techniques for Simulating Cloth and Other Deformable Objects, Miralab 1998.

Yucesoy, C.A.; Koopman, H.F.J.M.; Juijing, P.A.; Grootenboer, H.J., "Three-Dimensional Finite Element Modeling of Skeletal Muscle Using a Two-Doman Approach: Linked Fiber-Matrix Mesh Model," Journal of Biomechanics 35 (2002), pp. 1253-1262.

Zhang, X. et al.: "Numerical Simulation of 3D Dynamic Garment Pressure", Textile Research Journal, Sage Publications, London, GB, vol. 72, No. 3, Mar. 2002, pp. 245-252.

PCT International Search Report dated Sep. 25, 2008.

Ganovelli, Fabio, "Introducing Multiresolution Representation in Deformable Object Modeling," (1999) 10 pages.

Li, Yi; Newton, Edward; Luo, Xiaonan; Luo, Zhongxuan: "Integrated CAD for Functional Textiles and Apparel," from the Proceedings of Nokobetef 6 and 1st European Conference on Protective Clothing held in Stockholm, Sweden May 7-10, 2000, pp. 8-11.

* cited by examiner

DETERMINING ABSORBENT ARTICLE EFFECTIVENESS

FIELD OF THE INVENTION

The present invention relates to a method for determining the absorbent article effectiveness of a virtual absorbent article.

BACKGROUND OF THE INVENTION

One of the biggest challenges facing designers of absorbent articles is the need for understanding how absorbent articles function in use. Absorbent articles are commonly worn by people to manage a lack of bowel and bladder control, menstruation, and other discharges emanating from their bodies. Wearers of absorbent articles are engaged in a variety of activities including walking, crawling, sitting, cycling, running, playing team sports, and sleeping in a bed. For absorbent articles designed to be worn in proximity with a person's body, such as diapers and feminine care products, the absorbent articles must function in a complex environment in which the degree of intimacy between the absorbent article and the wearer's body varies in use. Not only does the contact between the absorbent article and the wearer's body vary in use, but the geometry of the wearer's body and the geometry of the absorbent article also vary. Changes in the contact between the absorbent article and the wearer's body and changes in the geometry of the wearer's body and the absorbent article can have significant impacts on the ability of an absorbent article to acquire fluid and how comfortable the absorbent article is to wear.

Absorbent articles are also used for cleaning, acquiring fluid from, and treating surfaces. These types of absorbent articles can be generally referred to as wipes. A wide variety of wipes including feminine wipes, diaper wipes, body wipes, toilet tissue, toilet paper, paper towels, facial tissue, handkerchiefs, surface wipes, countertop wipes, and floor wipes are commercially available. Surfaces such as countertops, floors, and table tops may be substantially rigid. Surfaces such as upholstery and animal bodies may be deformable. Surfaces may be treated by using absorbent articles as a dispensing article from which a cleaning aid or surface treatment is distributed. When an absorbent article is used to clean or treat a surface, the absorbent article is often scrunched up by the user, somewhat flattened out to fit within the palm of the user's hand, or affixed to a device to aid the user with using the wipe. The contact between the absorbent article and the surface can vary depending on how the user uses the absorbent article and how much the surface upon which the absorbent article is being used deforms. The intimacy of contact between the absorbent article and the surface upon which the absorbent article is being used can have significant impacts on the ability of an absorbent article to clean, acquire fluid from, and or treat a surface.

Absorbent articles worn in proximity with a person's body are designed to absorb a variety of fluids including urine, vaginal fluid, and bowel movement material. Fluid transfers from within a wearer's body to being contained in an absorbent article in what is essentially a three step process: (1) fluid emanates from the wearer's body, (2) fluid transfers from a surface of the wearer's body to the surface of the absorbent article, and (3) the absorbent article absorbs the fluid. The ability of an absorbent article to acquire fluid as the fluid is transferred off of the surface of the wearer's body is a key performance measure for absorbent articles. For instance, if a sanitary napkin is poorly designed, vaginal fluid that emanates from a woman's vagina is not acquired by the sanitary napkin and remains on the woman's skin in her pudendal region, which can result in discomfort to the woman. Another consequence of poorly designed sanitary napkins is that vaginal fluid that the sanitary napkin fails to capture can migrate until the fluid comes into contact with the woman's undergarments or outer clothing, which can result in a stain.

The ability of an absorbent article in proximity with a body to acquire fluid could be measured directly. For absorbent articles worn in proximity to a human body, there are many challenges to precisely measuring quantities of fluid emanating from the wearer's body, quantities of fluid in contact with the wearer's body, and quantities of fluid on the surface of and in the absorbent article. The challenges include social and physical discomfort of the person upon whom the measurements are made, non-compliance by the person subjected to the testing, as might occur with testing a diaper worn by an infant, and the complexity of the instruments required to make the measurements. An additional challenge is that instruments for analyzing movement of fluids on surfaces and in absorbent articles are often best suited for making measurements involving simple fluids like clean water, not complex fluids, such as urine, vaginal fluid, or bowel movement material.

Computer modeling can be used to analyze the conformance of garments on a human body. The modeling typically involves creating a three-dimensional representation of a human body and a garment and virtually representing a state of the garment when the garment is worn in proximity to the body. Some modeling software allows for movement of the body and enables analyses of the how the garment interacts dynamically with the body, such that the deformations of the wearer's body and the garment can be determined. Absorbent articles worn close to a person's body can be modeled using the same techniques. Thus, designers are able to predict the shape of absorbent articles worn in proximity with a person's body for a variety of in-use conditions. The same approach can be used to analyze how absorbent articles used for cleaning, acquiring fluid from, and treating surfaces interact with a surface such as a cushion or table.

Computer modeling can also be used to analyze movement of fluids in absorbent articles. The modeling typically involves creating a three-dimensional representation of an absorbent article and virtually representing a state of the absorbent article as the absorbent article acquires fluid from a source or dispenses a fluid. Due to the intense computing efforts required to solve equations that describe movement of fluids in absorbent articles, simplified equations that do not address the underlying physical causes of movement of fluid are sometimes used as a surrogate to more fundamentally based models.

The problem remains with how to couple computer modeling related to the shape of a body and an absorbent article worn in proximity to the body or used on the body with computer modeling of movement of fluid from the body to the surface of the absorbent article or within the absorbent article to determine the absorbent article effectiveness of a virtual absorbent article. To solve this problem, there is a need for the ability to quantify fluid transfer from the surface of a body to the surface of an absorbent article for a variety of in-use conditions. Furthermore, there is a need to be able to quantify how absorbent articles absorb fluid for a variety of in-use conditions to determine the absorbent article effectiveness of a virtual absorbent article. Finally, there is a need for the ability to quantify the fluid balance of absorbent articles worn in proximity with a wearer's body for a variety of in-use conditions, without involving human test subjects or physical measurements so that the absorbent article effectiveness of a virtual absorbent article can be determined.

SUMMARY OF THE INVENTION

A method for determining the absorbent article effectiveness of a virtual absorbent article is disclosed. The method can comprise the steps of providing a virtual body model, providing a virtual absorbent article model, providing virtual simulation software, running a virtual simulation of deformation of the virtual absorbent article model in proximity with the virtual body model, running a virtual simulation of the fluid balance of the virtual absorbent article model in proximity with the virtual body model, coupling the virtual simulation of deformation of the virtual absorbent article model and the virtual simulation of the fluid balance of the virtual absorbent article model, and determining absorbent article effectiveness of the virtual absorbent article model in proximity with the virtual body model. The step of running a virtual simulation of deformation of the virtual absorbent article model in proximity with the virtual body model can be performed prior to the step of running the virtual simulation of the fluid balance of the virtual absorbent article model in proximity with the virtual body model. The step of running a virtual simulation of the fluid balance of the virtual absorbent article model in proximity with the virtual body model can be performed prior to the step of running a virtual simulation of deformation of the virtual absorbent article model in proximity with the virtual body model. The steps of running a virtual simulation of deformation of the virtual absorbent article model in proximity with the virtual body model and running a virtual simulation of the fluid balance of the virtual absorbent article model in proximity with the virtual body model can be advanced alternately incrementally in time and in concert with one another. The virtual simulation of the fluid balance of the virtual absorbent article model in proximity with the virtual body model can comprise at least one parameter selected from the group consisting of a parameter describing the surface energy of the virtual body model, a parameter describing the surface energy of the virtual absorbent article model, and a parameter describing fluid surface energy.

The virtual simulation of the fluid balance of the virtual absorbent article model in proximity with the virtual body model can comprise at least one parameter that is variable as function of strain of the virtual absorbent article. The parameter that is variable as function of strain of the virtual absorbent article can be selected from the group consisting of porosity, saturated permeability, relative permeability, capillary pressure, irreducible fluid saturation, maximum fluid capacity, capillary pressure versus saturation relationship, relative permeability versus capillary pressure relationship, relative permeability versus saturation relationship, and contact angle between the fluid and the virtual materials comprising the virtual absorbent article.

The virtual simulation of deformation of the virtual absorbent article model in proximity with the virtual body model can comprise at least one parameter that is variable as a function of the fluid balance of portions of the virtual absorbent article. The parameter that is variable as a function of the fluid balance of portions of the virtual absorbent article can be selected from the group consisting of modulus, density, plasticity behavior, and Poisson ratio.

The virtual simulation of deformation of the virtual absorbent article model in proximity with the virtual body model can comprise at least one parameter that is variable as a function of strain of the virtual absorbent article. The at least one parameter that is variable as a function of strain of the virtual absorbent article parameter can be modulus.

The virtual absorbent article model can comprise more than one type of virtual absorbent material. The virtual absorbent article model can comprise a virtual topsheet, a virtual backsheet, and a virtual absorbent core disposed between the virtual topsheet and the virtual backsheet. The virtual absorbent article model can further comprise a virtual undergarment model. The virtual simulation of the fluid balance of the virtual absorbent article model in proximity with the virtual body model can comprise a virtual body model, wherein the virtual simulation of the fluid balance of the virtual absorbent article comprises at least one parameter describing the spatial relationship between the virtual absorbent article and the virtual body model. The at least one parameter describing the spatial relationship between the virtual absorbent article and the virtual body model can vary.

The virtual absorbent article can be representative of an absorbent article selected from the group consisting of sanitary napkins, pantiliners, incontinent pads, tampons, interlabial pads, diapers, and breast pads. The virtual absorbent article can be representative of an absorbent article selected from the group consisting of feminine wipes, diaper wipes, body wipes, toilet tissue, facial tissue, wound dressings, handkerchiefs, household wipes, window wipes, bathroom wipes, surface wipes, countertop wipes, and floor wipes. The virtual body model can represent a human. The virtual body model can represent a household surface.

DETAILED DESCRIPTION OF THE INVENTION

The method and system of the present invention can be used for designing absorbent articles intended for close body proximity. As used herein, the word body is used in a generic sense to refer to a sensible object in physical space. As used herein, the word "body" includes an animal body, the human body also being considered as an animal body. The word "body" also includes objects upon which absorbent articles are used for cleaning, acquiring fluid from, and treating surfaces. Bodies further include, but are not limited to, upholstery, carpet, flooring, countertops, windows, household fixtures, interior household surfaces, automobile parts, exterior household surfaces, and the like. Absorbent articles within the scope of the present invention include, but are not limited to, sanitary napkins, pantiliners, interlabial pads, incontinent pads, tampons, diapers, and breast pads. Other absorbent articles within the scope of the present invention also include, but are not limited to, feminine wipes, diaper wipes, body wipes, toilet tissue, facial tissue, wound dressings, handkerchiefs, household wipes, window wipes, bathroom wipes, surface wipes, countertop wipes, and floor wipes, all generally referred to in the art as wipes. Absorbent articles include, but are not limited to, clothing, sweat bands, arm bands, and clothing for the absorption of sweat.

Figure 1:
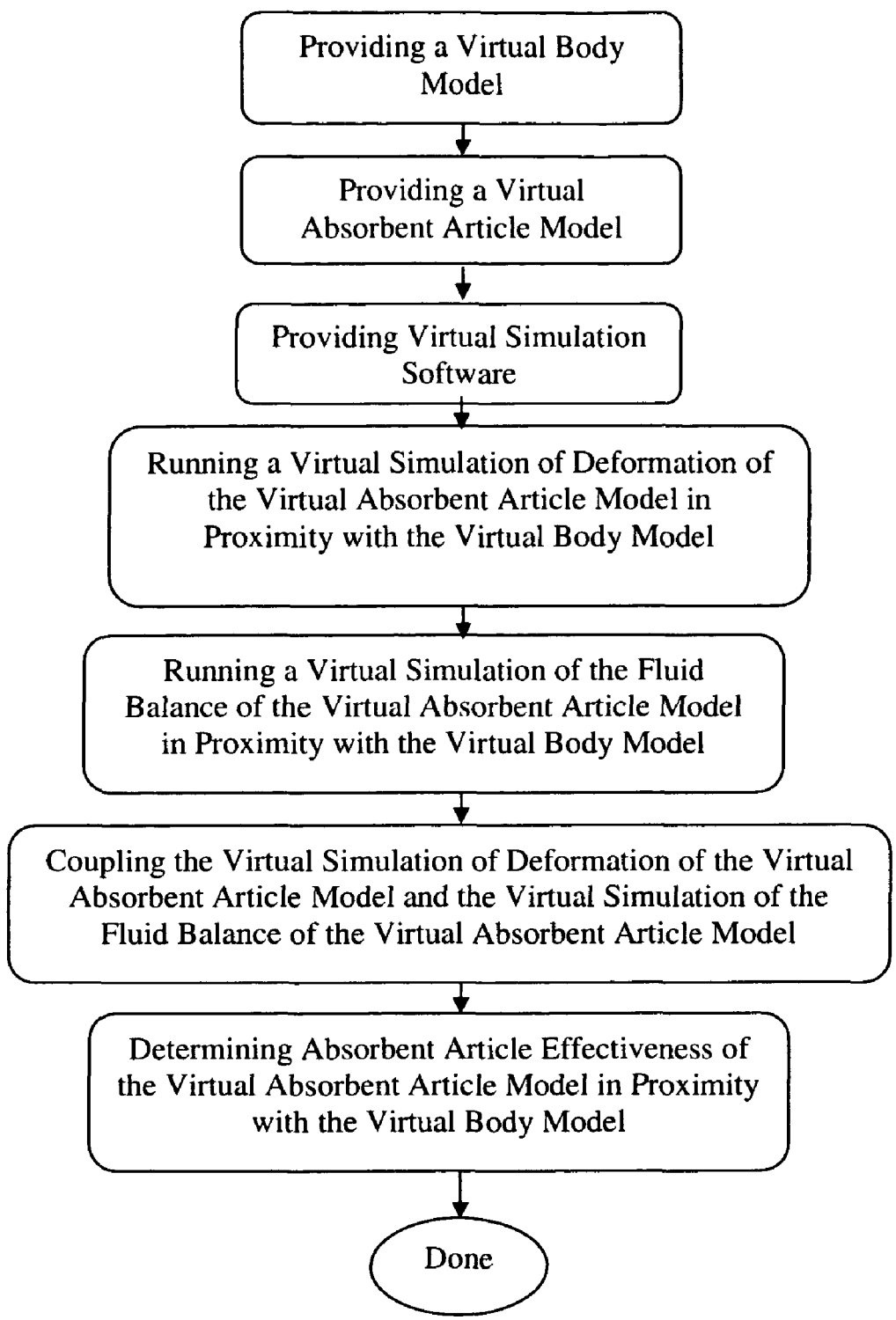
FIG. 1 is a flow chart of a method for determining the effectiveness of a virtual absorbent article.

FIG. 1 illustrates a flowchart of an embodiment of the invention. The steps of the method comprise, providing a virtual body model, providing a virtual absorbent article model, providing virtual simulation software, running a virtual simulation of deformation of the virtual absorbent article model in proximity with the virtual body model, running a virtual simulation of the fluid balance of the virtual absorbent article model in proximity with the virtual body model, coupling the virtual simulation of deformation of the virtual absorbent article model and the virtual simulation of the fluid balance of the virtual absorbent article model, and determining absorbent article effectiveness of the virtual absorbent article model in proximity with the virtual body model. The method can be executed in a computer system comprising a central processing unit, a graphical user interface including display, and a user interface selection device communicatively coupled to the central processing unit.

The steps of providing a virtual body model, providing a virtual absorbent article model, running a virtual simulation of deformation of the virtual absorbent article model in proximity with the virtual body model are described in U.S. patent application Ser. No. 11/072,152 by Macura et al. along with virtual simulation software for running a virtual simulation of deformation of the virtual absorbent article model in proximity with the virtual body model. Other U.S. Patent Applications and Patents related to virtual product modeling include Ser. No. 11/071,917 by Anast et al., Ser. No. 11/071,919 by Looney et al., Ser. No. 11/071,916 by Anast et al., 11/071,918 by Anast et al., Ser. No. 11/071,920 by Macura and Lavash, Ser. No. 11/072,047 by Lavash et al., U.S. Pat. No. 6,810,300 by Woltman et al., and U.S. Pat. No. 7,099,734 by Pieper et al.

Figure 2:
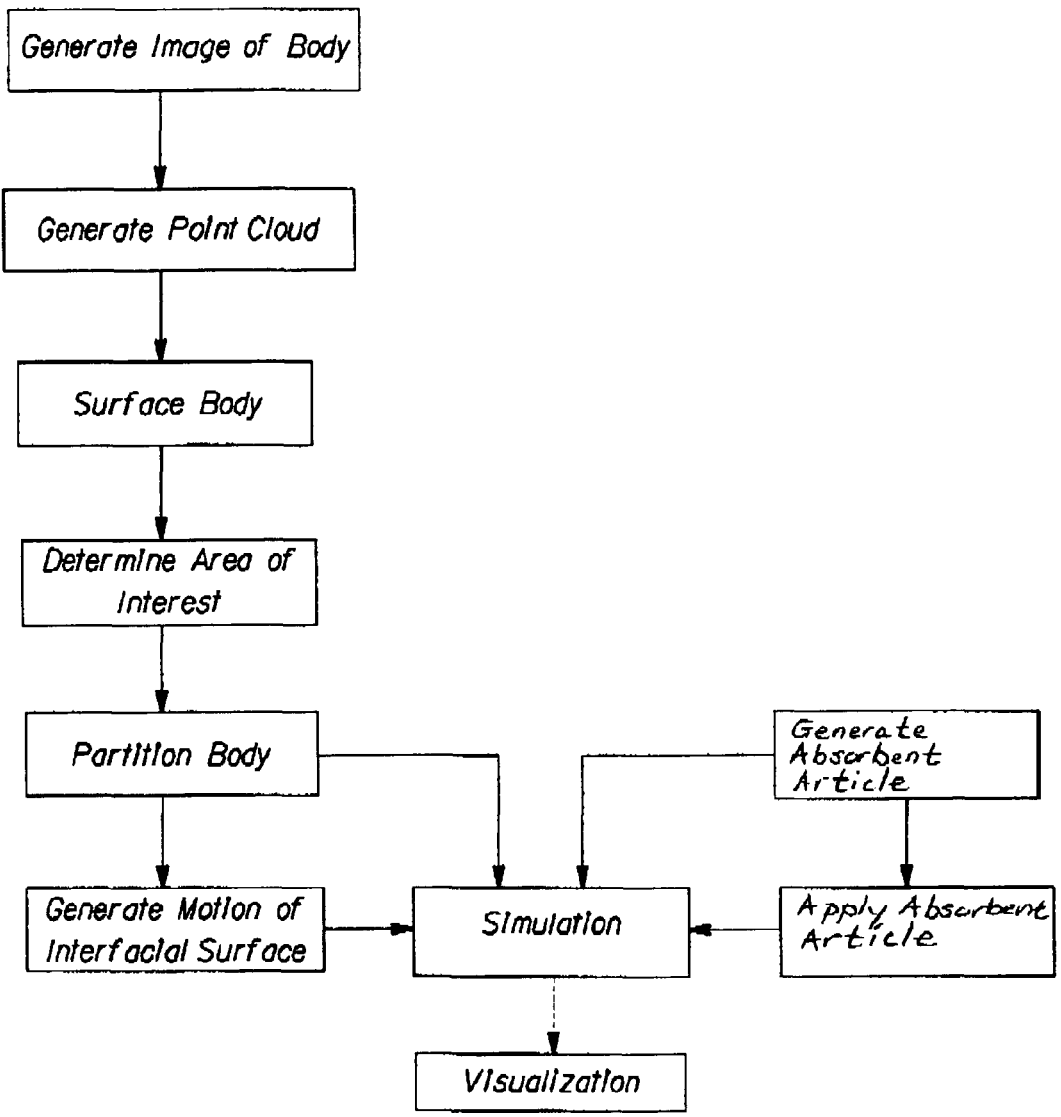
FIG. 2 is a flow chart depicting schematically one embodiment of a system for running a virtual simulation of deformation of a virtual absorbent article model in proximity with a virtual body model.

Elements associated with the steps of providing a virtual body model, providing a virtual absorbent article model, providing virtual simulation software, running a virtual simulation of deformation of the virtual absorbent article model in proximity with the virtual body model are depicted in the flowchart shown in FIG. 2.

To create a virtual body model, a body, or a portion thereof can be imaged. From the image, the body, or portion thereof can be surfaced. Surfacing is a technique for rendering a computer generated three-dimensional (3D) image of an actual 3D object. In one embodiment, the waist region of an adult human female, including the crotch region 10 and pudendal region, can be the body. In another embodiment, the waist region of an infant human can be the body, which can be useful for modeling diapers. In another embodiment, the body can be an object upon which an absorbent article is used for cleaning, acquiring fluid from, and or treating the surface of the object, such as a cushion of a leather upholstered couch.

Surfacing of a body can be achieved by means known in the art, such as by imaging the exterior surface of a portion of a body by making a series of images of the desired portion of the body using surface digital imaging techniques. Alternatively, portions of a body can be surfaced using techniques that also capture internal portions, such as magnetic resonance imaging (MRI). Other techniques for obtaining suitable images for surfacing can be used, such as ultrasound imaging or x-ray imaging. Other known techniques, including silhouette capture and the like, can also be useful in situations in which the required body position for MRI imaging causes distortion of the body in key regions of interest.

The resolution of the MRI images will determine the level of detail available for analysis of conformance. Therefore, the MRI scan should have sufficient resolution, including a sufficient number of "slices," to capture features relevant to analyses. For conformance and comfort analyses of absorbent articles worn in proximity with a persons body, anatomical features can be relevant to conformance and comfort. The term "slices" is used in its ordinary sense with respect to MRI scans, and denotes the two-dimensional images produced by MRI imaging. In one embodiment, coronal slices of the waist region of an adult female were imaged with a 2 mm (1:1 scale) increment resolution using a GE Medical Systems Genesis Sigma 1.5 Echo Speed LX MRI unit. The data output can be a series of DICOM image files that can be exported for further evaluation and analysis. The DICOM image files can have multiple regions corresponding to various components or layers of the body. For a human body, the regions can be different layers of tissue. For example, each slice of an MRI image may show regions of fat, skin, muscle, bone, internal organs, and the like. For the purposes of an embodiment such as a sanitary napkin, the regions of skin, fat and muscle in the pudendal region may be of the most interest. For a wipe to be used on upholstery, the regions of the surface cover, backing layer, and filler material may be of the greatest interest.

A point cloud representation can be made from the DICOM image files. On each slice of MRI images, the various regions, and the interface between regions can be located and designated by a series of points which can be identified and designated by either the software or manually by the user. The points so designated create a point cloud representation of each slice of the MRI image. The number, concentration, and spacing of the points can be chosen to get sufficient resolution for the portion of the body being modeled, such as sufficient resolution to capture the undulations of tissues, e.g., the skin, in the various regions, or complex geometry of a surface such as upholstery. In general, the number of points and their spacing should be such that relevant portions of the body are accurately represented to a sufficient resolution relevant to conformation of the absorbent article with the body. In one embodiment, a distance of about 2 mm (1:1 scale) between points of the point cloud was found to provide sufficient resolution for analyzing conformance and comfort of an absorbent article worn in proximity to the vagina of an adult human female body.

Figure 3:
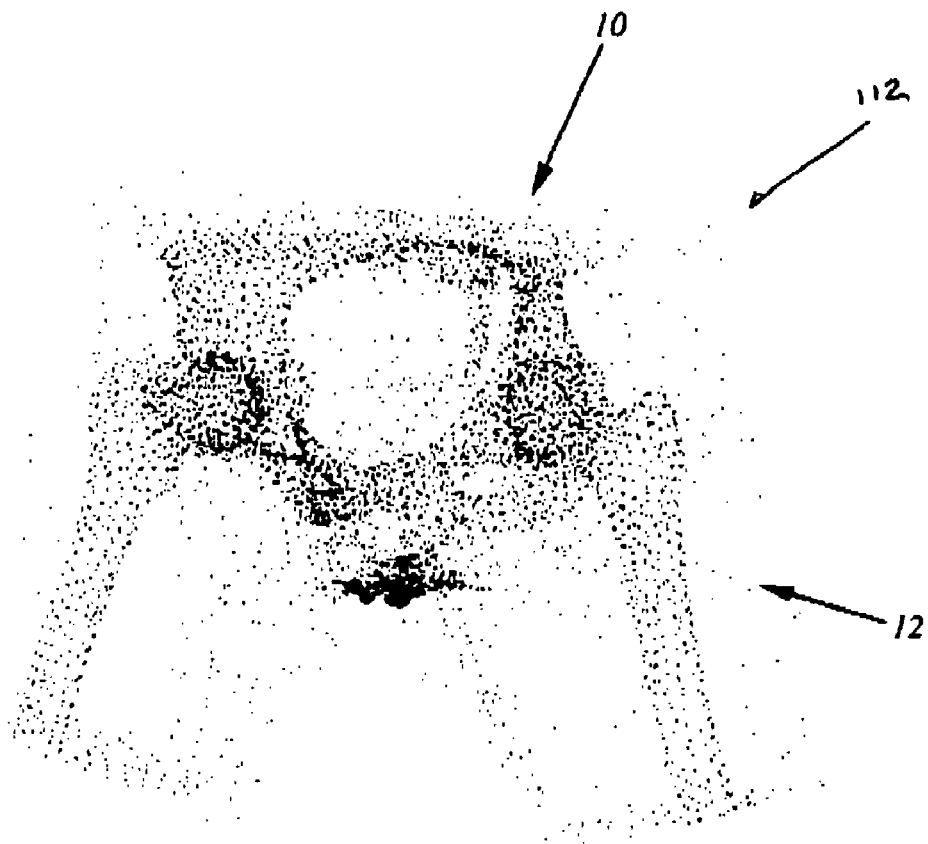
FIG. 3 is a depiction of a point cloud.

Once the points on each two-dimensional MRI slice are placed, software, such as SLICEOMATIC®, available from Tomovision (Montreal, Canada), can be used to generate a three-dimensional point cloud based on the relative position of the MRI slices. Once the three-dimensional point cloud is obtained, the data can be stored in electronic format in a variety of file types. For example, the point cloud can include a polygonal mesh in which the points are connected and the point cloud can be saved as a polygonal mesh file, such as a stereolithography file, that can be exported for further evaluation and analysis. An example of a visual rendering of a 3D point cloud 12 for the waist and crotch region 10 of a human female is shown in FIG. 3.

The point cloud of the body portion 112 can then be surfaced by using suitable software, including most computer aided design (CAD) software packages, such as, for example, GEOMAGIC®, available from Raindrop Geomagic (Research Triangle Park, N.C.). Surfacing can also be achieved by any of various means known in the art, including manually, if desired. In one embodiment, particular regions of a human body can be surfaced, such as the interface between fat and muscle, fat and skin, and/or muscle and bone. In another embodiment, the surface of a textured linoleum floor can be surfaced. In essence, any surface of interest can be surfaced.

Alternatively, MRI data can be surfaced through use of voxel approaches without first generating a point cloud.

Once the body portion 112 of interest is surfaced, the specific body portion 112 of interest to be modeled is determined. For example, when modeling a sanitary napkin, the portion of the human body surfaced may be the entire waist and crotch region 10 of an adult female, while the body portion 112 of interest to be modeled is the pudendal region. The body portion 112 of interest to be modeled can be the portion of the body in which the effects of deformations on the fluid balance, conformance, and comfort are to be considered. The fluid balance of the virtual absorbent article is the mass of fluid that flows into or out of particular potions of the virtual absorbent article over a time increment of interest.

Figure 4:
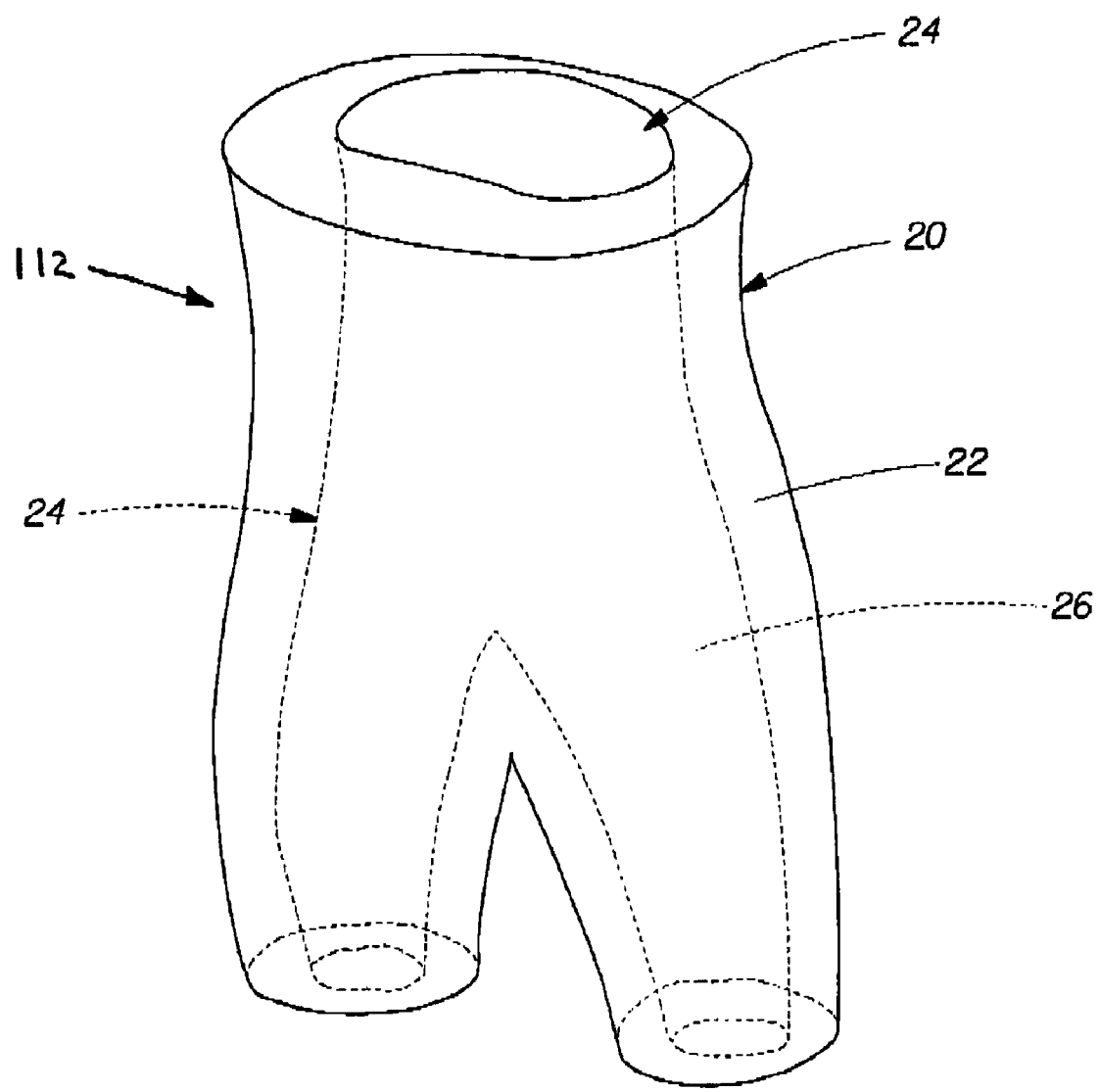
FIG. 4 is a schematic representation of two defined volumes.

After determining the body portion 112 of interest to be modeled, the surfaced portion can be arbitrarily partitioned into at least two volumes to isolate in one volume the body portion 112 of interest to be modeled, i.e., portion of the body that is to remain deformable during modeling based on physics-based criteria. If the body is to move, as might occur for a human body, the remainder of the surfaced volume can simply be modeled by prescribed motion, thereby conserving resources in computing time. In one embodiment involving a human body, as shown in FIG. 4, the surfaced body is partitioned into two separate, non-intersecting volumes, including at least a deformable volume 22, and at least a prescribed motion volume 26. By "deformable volume," it is meant a volume in which, when the simulation is performed, the physical behavior, including but not limited to, stress, deformation and motion, are computed. Conversely, by "prescribed motion volume" it is meant a volume in which the deformations and motions are dictated by input to the simulation. The prescribed motion volume 26 can be static, as might be the case for a body such as a cushion of a couch.

By "non-intersecting" with respect to the two volumes, it is meant that the volumes do not overlap, i.e., no portion of the modeled body consists of both the deformable volume 22 and the prescribed motion volume 26, but the two volumes are distinctly partitioned. In one embodiment, only the deformable volume 22 need be determined, and then, by definition, the remainder of the body portion 112 to be modeled represents the prescribed motion volume 26. The two volumes can share a common surface interface, which is all or a portion of their respective surfaces shared between the two volumes.

As shown in FIG. 4, interfacial surface 24 can be fully interior to the surfaced body portion 112, i.e., a surface defined as being a certain distance "in," so to speak, from the external surface 20. The distance in can be termed the "surface normal distance," and should be great enough so as to allow for the external surface 20 to be deformable when modeled. The surface normal distance can be three to five times greater than the anticipated magnitude of the surface indentation. Further, the interfacial surface 24 should be in sufficient proximity to the external surface 20 so as to be capable of driving motion of at least a portion of the external surface 20. In the embodiment shown in FIG. 4, interfacial surface 24 defines prescribed motion volume 26 which is "inside" deformable volume 22 and forms no part of the external surface 20 except at the cross-sections of the body portion 112.

Figure 5:
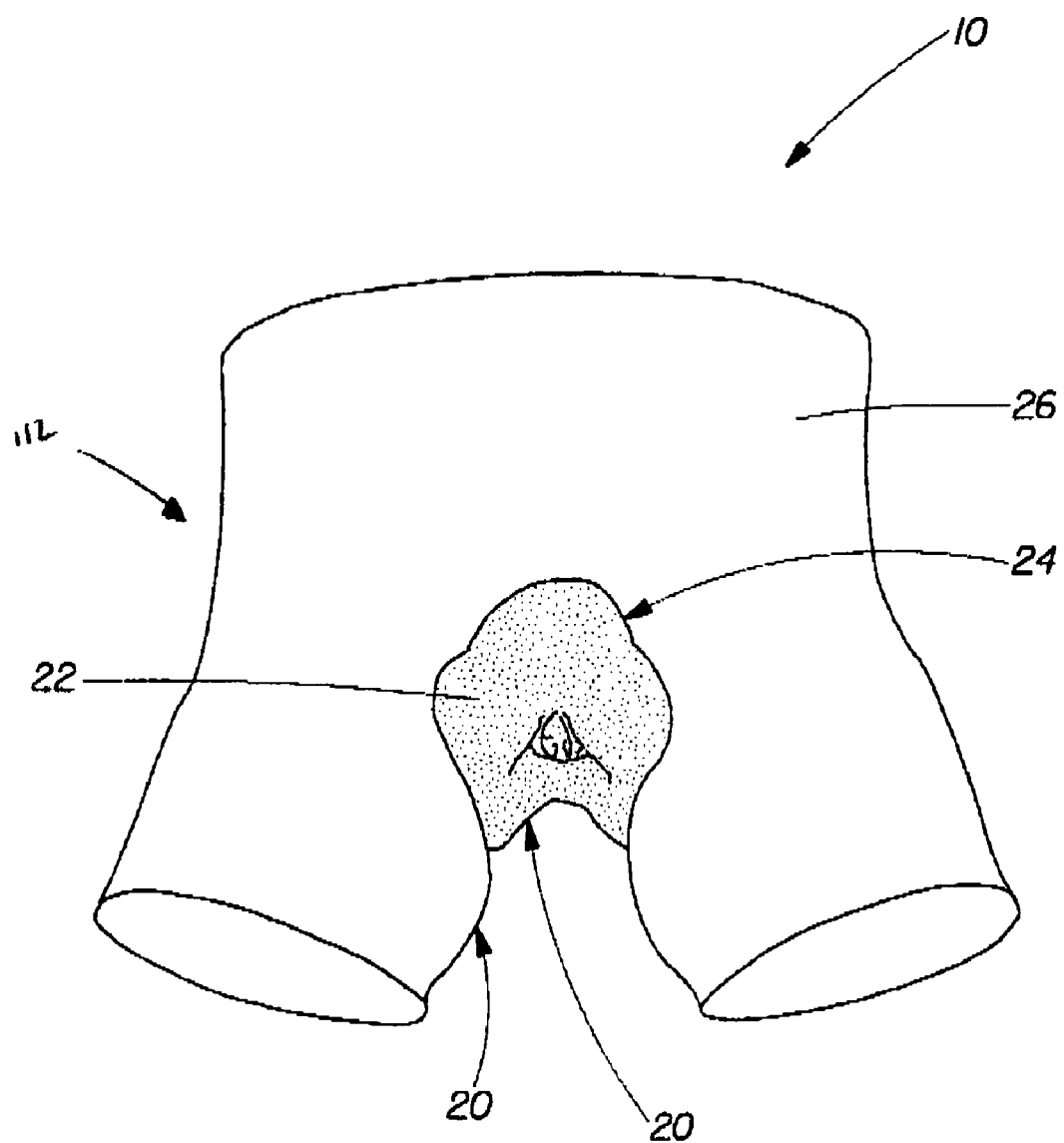
FIG. 5 is another schematic representation of two defined volumes.

As shown in FIG. 5, interfacial surface 24 can extend to and be partially bounded by a portion of the external surface 20. In FIG. 5, deformable volume 22 and prescribed motion volume 26 meet at interfacial surface 24 that extends to external surface 20. Two volumes that have been found to be useful for modeling feminine hygiene devices, such as sanitary napkins, are shown in FIG. 5. As shown, a deformable volume 22 corresponds to the body portion 112 of interest to be modeled, in this case the pudendal region of an adult female for evaluation of a sanitary napkin. Likewise, a prescribed motion volume 26 (or surface) corresponds to the portions of the body where the impact of the absorbent article on the body is of lesser interest, but which may impact the analysis of conformance and overall body movement.

After partitioning the virtual body model, the partitioned virtual body model can be meshed for modeling in a prescribed motion model as a prescribed motion volume 26. From the surfacing software, such as GEOMAGIC®, the surfaces can be imported into software capable of rendering the surfaces in three dimensions, such as I-DEAS® available from UGSPLM Solutions, a subsidiary of Electronic Data Systems Corporation (Plano, Tex.), through an IGES file format, for example. Using I-DEAS®, the surfaces are used to generate 3D renderings defining corresponding separate components corresponding to the tissues in the portions of the body to be analyzed, for example the fat, muscle, and bone of a human body. To generate these 3D renderings, the technique of volume rendering from surfaces can be used, as is commonly known in the art.

Figure 6:
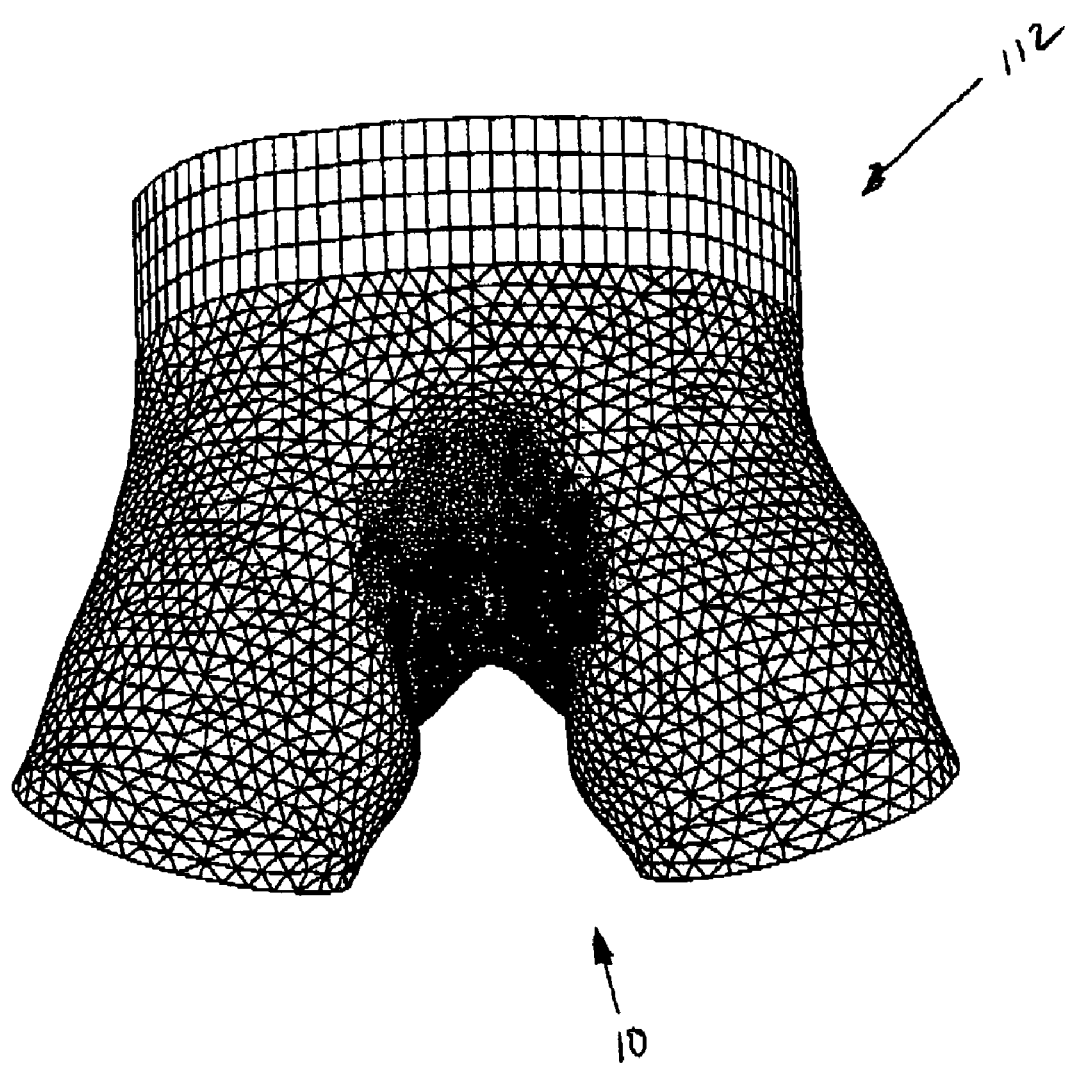
FIG. 6 is a schematic representation of a meshed virtual body model.

The deformable volume 22 can be meshed into a mesh of nodes and elements by means known in the art. For example, meshes can be created containing solid elements, shell elements, or beam elements, or combinations thereof. In the method of the present invention, the deformable volume 22 can be meshed as solid elements as shown in FIG. 6. For a human body, various tissues within the deformable volume 22, such as fat tissues, muscle tissues, and the like can be meshed into separate parts, and each part can have appropriate material properties assigned to it, yet the continuity of the mesh can be maintained. For a body such as a surface upon which an absorbent article can be used for cleaning, acquiring fluid from, and or treating the surface, portions of the virtual body model can be comprised of two or more layers. Each separate layer can be meshed in separate parts. For example, a cushion of a couch might be able to be separated into three parts comprising the surface layer, a backing layer, and a filler material, each meshed into separate parts. As shown in FIG. 6, portions of the deformable volume 22 can be meshed with a greater density of nodes and elements than other portions.

The prescribed motion volume 26 may be created using shell elements or solid elements. The prescribed motion volume 26 need only be meshed sufficiently to enable realistic modeling for both static and dynamic conditions.

To do motion simulation and/or conformance modeling, the motion of the body portion 112 being modeled needs to be driven, i.e., moved through space in time. In one embodiment of the present invention, motion can be driven by driving at least portions of an interfacial surface 24. The interfacial surface 24 drives a deformable volume 22 that can be subject to physics-based constraints. Driving the interfacial surface 24 in turn drives motion of the deformable volume 22, which can be free to move and deform, with the deformations producing quantifiable stress and strain. If used to model absorbent articles being worn, the measurable stress and strain can be due to contact with the absorbent article being modeled. Multiple layers of absorbent articles can be tested at the same time. For example, a diaper can be covered in the back by fastening means such as tapes or a sanitary napkin can be worn in an undergarment.

The interfacial surface 24 can be driven along predetermined motion paths in space and time. The predetermined motion paths can be generated using external motion capture. For example, various technologies, such as photography, digital imaging, stereo lithography, laser scans, and the like can be used to capture the motion of discrete identified points on the exterior surface of a body in motion. The motion capture means can capture the position of the identified points at discrete locations in space over time. For a given point, the number of instances of point capture in a given time, i.e., the frequency of capture, can be adjusted as desired to produce a series of paths in space for each point tracked on the moving body. The series of paths can be used to drive motion of the corresponding points on the mesh body to be analyzed for conformance and motion. Other forms of motion capture include the use of fiber optic shape tape, magnetic field capture, "flock of birds" techniques, and other known techniques for capturing motion using point of sight or hidden means.

To simulate motion of the prescribed motion volume 26, a motion template can be captured or computed. In one embodiment, motion capture can be achieved by using processed video imaging. In such a process, multiple video images of an actual body portion 112 of interest are recorded from multiple calibrated camera positions with respect to the body and processed to extract the shape of the body, a technique which is known in the art. The shape of the video-imaged body can be created by means known in the art, such as by voxel carving to produce a point cloud, by shape from silhouette to produce a surface, and the like. Additionally, using photogrammetry, features in the processed video imagery can be used for measurements. Such measurements can include strain measurements on surfaces such as skin, garments, or surface coverings, which can be incorporated into the motion template.

In one embodiment, MAYA® software available from Alias (Toronto, Canada) or the like can be used. Using MAYA®, for example, a representative body shape, such as a point cloud or surface shape, can be recorded for each step of interest in time. Once all the body shapes are recorded for each increment of time, the shapes together are a motion template representing body motion, but this template is not suitable for FEA analysis because the template is not based upon meshed nodes having known locations and parameters.

The motion model useful for analysis by FEA techniques can be made by fitting, as the term is used in the art, the prescribed motion model to the motion template(s). In one embodiment, the fitting can be accomplished by the following steps. First, the prescribed motion model is skinned, as the term is used in the art, to get a poseable model. Skinning is a technique that is itself known in the art and can be performed using software such as the MAYA®. For example, MAYA® permits a joint segment skeleton to be created that can be placed inside the prescribed motion model, and thereafter skin the model.

Next, the poseable model can be aligned to one of the motion templates captured or computed above. This step can be repeated for each of the motion templates representing changing poses through time. This is referred to as a "first fit." As a "second fit," the surfaced body can be deformed to match the motion template for each of the templates of interest. Then software, such as MAYA®, can interpolate motion at each time frame. MAYA® can save the data as an animation, but does not have the capability to translate the data into data useful for FEA analysis. Therefore, this data can be exported for motion analysis by FEA techniques.

For FEA analysis, the motion paths created in MAYA® can be exported to generate displacement paths to create three dimensional displacement paths versus time for every node of interest. This series of paths (i.e., three paths (x, y, z) for each node) can be saved as a text file for further analysis. Further, contact properties, such as coefficients of friction, can be input to account for the physics between the separate volumes and/or the external surface 20.

With the nodal displacements on the external surface 20 known, this information can be used within ABAQUS®, available form Abaqus, Inc., Pawtucket R.I., to directly move the external body surface by using nodal displacements commands for each node for which a displacement path has been generated. Using ABAQUS®, as the external, visible surface is driven, the motion of all nodes on the meshed body are computed. In ABAQUS®, the displacements for all nodes are computed using a physics-based calculation in which nodal displacements for a fixed pre-defined displacement are dependent primarily upon the fundamental material properties of the body.

As the mesh of the external surface 20 is driven, the motion of the interfacial surface 24 can be recorded. This information can be recorded in the form of nodal displacements for at least a portion of the interfacial surface 24 and can be saved as interfacial surface motion paths (i.e., "boundary conditions" and "amplitude" in the terminology of ABAQUS).

The prescribed nodal displacement on the external surface 20 of the deformable volume 22 can then be removed and replaced with a prescribed nodal displacement of the interfacial surface motion paths. The interfacial surface motion paths can then be used to drive the motion of the modeled body, including portions of the external surface 20 that may be part of the prescribed motion volume 26. Driving the interfacial surface 24, therefore achieves simulated motion of the body portion 112 being modeled.

The benefit of being able to drive the volume interface in conjunction with the external visible surface of the non-deformable volume 22 is that realistic motion can be accurately represented and allows a portion of the external surface 20 of the body to be deformable without any prescribed motions defining how that portion deforms. Additionally, the number of nodes and elements required can be minimized and still allow for accurate and efficient analysis of a portion of a moving or deforming body.

The virtual body model can be modeled with a virtual absorbent article model or multiple virtual absorbent article models. The virtual absorbent article model to be evaluated by the method of the present invention can be generated by producing a computer aided design (CAD) geometry of the actual absorbent article of interest. CAD geometries can be produced from CAD drawings, as is known in the art. Once the CAD geometry is produced, it can be meshed into a mesh of nodes and elements by means known in the art. The number of nodes and elements can be varied as necessary or desired to adequately model the absorbent article. Furthermore, contact properties, such as coefficients of friction between the body parts or between the body and the absorbent article, can be input to describe the physics between the separate volumes and/or the external surface 20.

Figure 7:
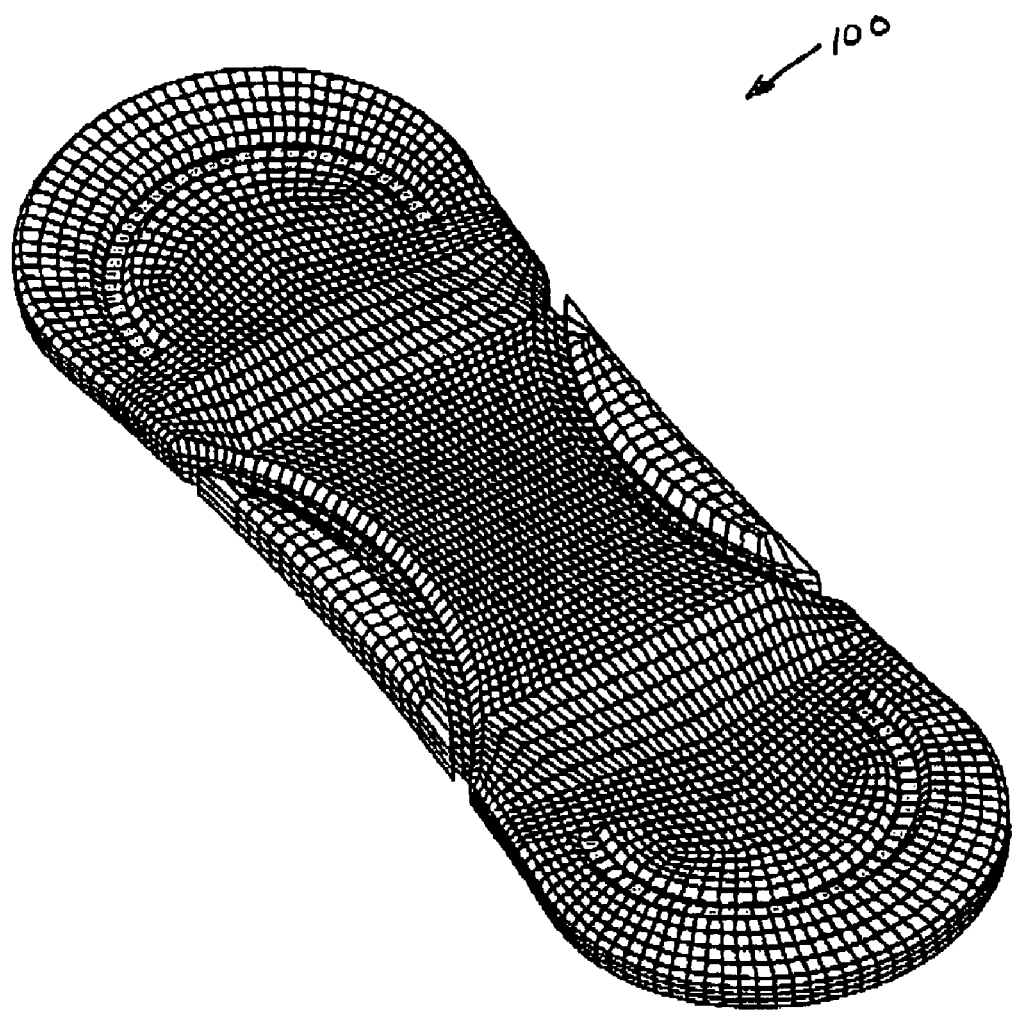
FIG. 7 is a schematic representation of a meshed virtual absorbent article model.

In one embodiment, the virtual absorbent article model can be a sanitary napkin 100, which is intended to be worn against the body of an adult woman. A meshed sanitary napkin 100 is shown in FIG. 7. In most cases, the sanitary napkin 100 is worn inside of an undergarment, such as elasticized panties. Therefore, in one embodiment of the present invention, the virtual absorbent article model can actually be a virtual absorbent article system representative of an absorbent article and an undergarment supporting the absorbent article. That is, the virtual absorbent article model can further comprise a virtual undergarment model.

An absorbent article can be comprised of more than one component. An absorbent article can comprise one or more structural components providing for mechanical integrity of the absorbent article. An absorbent article can comprise one or more fluid handling components. An absorbent article can comprise a combination of one or more structural components and one or more fluid handling components. A single component of the absorbent article can provide for both mechanical integrity and fluid handling. In creating the virtual absorbent article model, each component can be created as a separate part and meshed independently. This enables individual material properties to be assigned to each component and material properties of each component can be heterogeneous. For example, an undergarment can have at least three components: the overall panty fabric, the crotch fabric, and the elastic strands. Each of these components can be created as separate parts with individualized material properties appropriate for each material or parts of each material. The material properties can be varied for different garments. In another example, an absorbent article can be comprised of a topsheet 80, a backsheet 95, and an absorbent core 82 disposed there between and each element of the absorbent article can be created as a separate part and meshed independently. Thus, within the context of the present application, the virtual absorbent article model can be described as comprising a virtual topsheet, a virtual backsheet, and a virtual absorbent core disposed between the virtual topsheet and the virtual backsheet. The absorbent core 82 (or virtual absorbent core) can be what is known in the art as an absorbent system comprising one or more fluid distribution layers and one or more fluid storage layers.

In one modeling approach, the virtual absorbent article model is simplified to characterize portions of the virtual absorbent article model as either being saturated or unsaturated. Characterizing portions of the virtual absorbent article model as being either saturated or unsaturated can be simpler than assigning each element a level of partial saturation.

The virtual absorbent article model can be modeled in various initial states, such as in a relaxed, undeformed state, or in a non-relaxed or deformed state. For example, a sanitary napkin 100 can be initially modeled in a generally flat, undeformed initial state, as shown in FIG. 7, or it can be initially modeled in a bunched, folded state.

Predetermined fixed points on the meshed virtual absorbent article model, or virtual absorbent article system, can be identified, the fixed points being fixed in space or with respect to the meshed body during conformance analysis. In general, the fixed points can be a maximum distance from the deformable volume 22 of the meshed body.

The fixed points aid in the virtual absorbent article model being "applied" to the virtual body model by using motion paths to prescribe motion to the fixed points such that the fixed points are translated from a first initial modeled position to a second fixed position relative to the virtual body model. To simulate conformance of the virtual absorbent article model to the virtual body model, the virtual absorbent article model or absorbent article system can be first "applied" as described above. At this point, the simulation can calculate stresses and strains associated with conformance prior to body motion. By driving motion of the body through the predetermined motion paths of the interfacial surface 24, dynamic stress-strain calculations on the deformable volume 22 and virtual absorbent article model or virtual absorbent article system can be made.

Dynamic stress-strain analysis can be achieved using a dynamic stress-strain analyzer, such as, for example, LS-DYNA® (Livermore Software Technology Corporation, Livermore, Calif.), ABAQUS® (ABAQUS Inc., Pawtucket, R.I.), or ANSYS® (ANSYS Inc., Canonsburg, Pa.). Any desired inputs, such as body mesh motion, virtual absorbent article model mesh motion, contact surfaces, virtual absorbent article model mesh, and/or body mesh can be input to accomplish the analysis. The stress-strain analyzer supplies an output of deformed motion and corresponding forces as well as stress and strain. The forces include forces associated with deforming both the virtual body model and the virtual absorbent article model.

Optionally, the simulation output, such as deformations and forces, can be visualized using software such as LS-PREPOST® (Livermore Software Technology Corporation, Livermore, Calif.), HYPERVIEW® (Altair Engineering, Troy, Mich.), ENSIGHT® (Computational Engineering International, Apex, N.C.), or ABAQUS VIEWER® (ABAQUS Inc., Pawtucket, R.I.), or other suitable visualization software. Visualization of the virtual absorbent article model as the virtual absorbent article model is manipulated can show in visual representation the deformation of the virtual absorbent article model. For example, a sanitary napkin can undergo buckling, twisting, and bunching during wear. Such deformation can be difficult, if not impossible, to watch in real time on a real person due to the practical constraints of such a system.

Visualization software enables a modeler to output a defined portion of the analysis as a three-dimensional representation in a user defined simulation state. The modeler can select parts or elements of interest in an arbitrary deformed state and output them as a three-dimensional representation such as a sterolithography file, a VRML file, or a deformed mesh. In one embodiment, LS-PrePost can be used to output simulation results for at least a portion of a virtual absorbent article model in a deformed state as a stereolithography file and at least a portion of the virtual body model in the same state as the stereolithography file. Output files can be converted from one output format to another using a conversion algorithm, as is known in the art.

A virtual simulation of the fluid balance of the virtual absorbent article model in proximity with the virtual body model can be run using computational fluid dynamics (CFD) software. One CFD program suitable for practicing the methods disclosed herein is FLOW-3D®. FLOW-3D® is a commercially available multi-physics software code developed and distributed by Flow Science, Inc., Santa Fe, N. Mex. FLOW-3D® can be run on a desktop computer or a computer having a more advanced operating system such as UNIX. The virtual simulation of the fluid balance of the virtual absorbent article model can be performed in a one-dimensional, two-dimensional, or three-dimensional framework.

The fluid balance of the virtual absorbent article model can be negative, static, or positive. If the mass of fluid in the virtual absorbent article model decreases, as would occur for an absorbent article that dispenses a substance, the fluid balance of the virtual absorbent article model is negative. If the mass of fluid in virtual absorbent article model does not change, the fluid balance of the absorbent article is static. If the mass of fluid in the virtual absorbent article model increases, as would occur for an absorbent article designed to acquire fluid, the fluid balance of the virtual absorbent article model is positive. Portions of the virtual absorbent article can have a fluid balance that differs from other portions of the virtual absorbent article.

Figure 8:
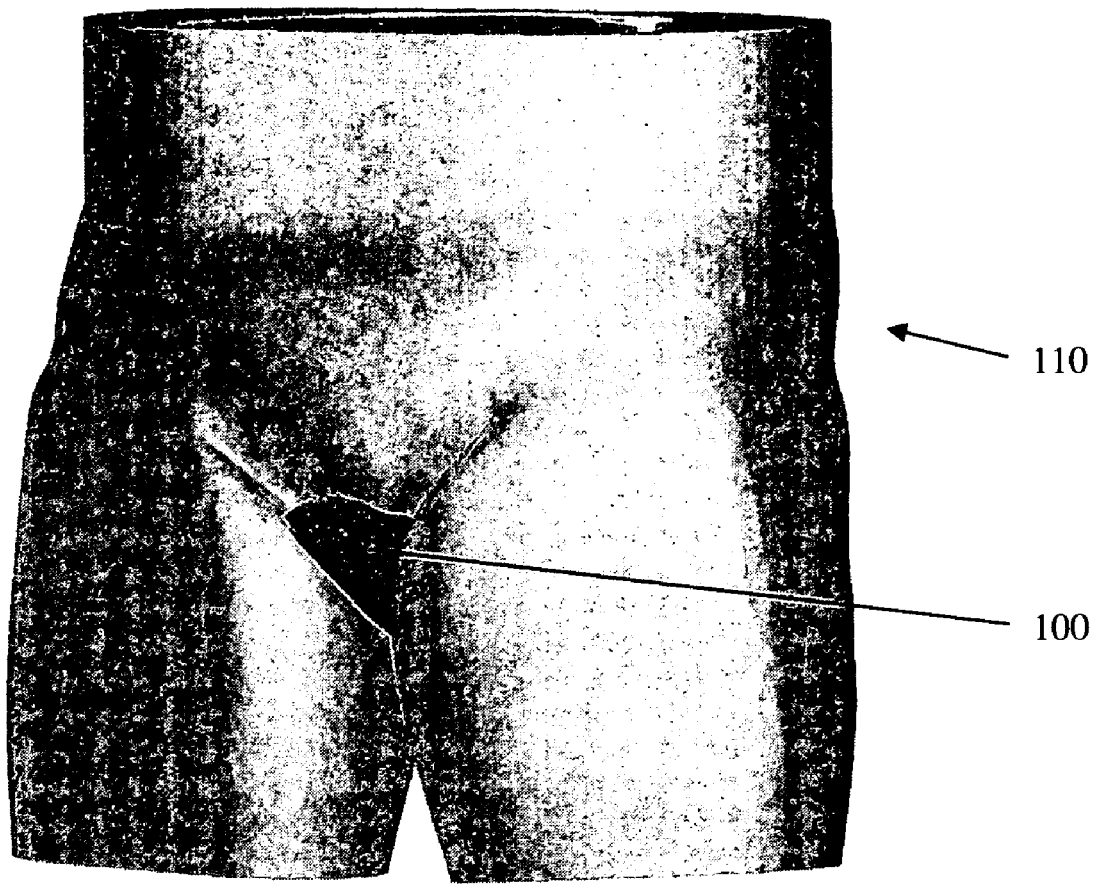
FIG. 8 is a schematic of a virtual absorbent article model worn on a virtual body model.

The physical dimensions of the virtual body model and the virtual absorbent article model can be imported into the CFD software using a stereolithography (STL) file. A virtual body model of a human female 110 wearing a virtual absorbent article model comprising a sanitary napkin 100 is shown in FIG. 8. The virtual absorbent article model can be representative of a deformed absorbent article. The shape of the deformed absorbent article can be determined from a virtual simulation of deformation of the virtual absorbent article model as described above. The shape of the deformed absorbent article can also be determined using simplified mechanical models that can be solved by hand or with the help of a computer or calculator. The shape of the deformed absorbent article can be based solely on a designer's conception of how the absorbent article being modeled should behave based on intuition or using any other approaches known in the art for predicting or conceptualizing the deformed shape of an absorbent article. The virtual absorbent article model can also be representative of an undeformed absorbent article.

Once imported, the virtual body model and virtual absorbent article model can be meshed into nodes and elements by means known in the art. The number of nodes and elements can be varied as necessary or desired for adequate modeling of the fluid balance of the virtual absorbent article model. The physical dimensions of the surfaces, as well as the topography of the surfaces, can also be described. For detailed fluid structure interaction modeling, the surface topography, or roughness, can be described on the micron scale. A more coarse description of the topography can be used if the surfaces are regular. The virtual simulation of the fluid balance of the virtual absorbent article model need not include the virtual body model as a component of the model, although all of the effects of the virtual body model on the fluid balance of the virtual absorbent article model may not be able to be discerned using this approach.

Within the CFD software, the boundary conditions, initial conditions, material properties, solver control, and output control can be specified. The boundary conditions can include one or more fluid sources. The transient nature of boundary conditions can also be input into the virtual simulation of fluid acquisition to account for variations in the fluid source, as may occur in a menstruating woman in which long time spans of little or no flow are interrupted by short periods of high flow. In essence, the virtual simulation of the fluid balance of the virtual absorbent article model in proximity with the virtual body model can comprise a source of fluid applied over a particular time and area.

Figure 9:
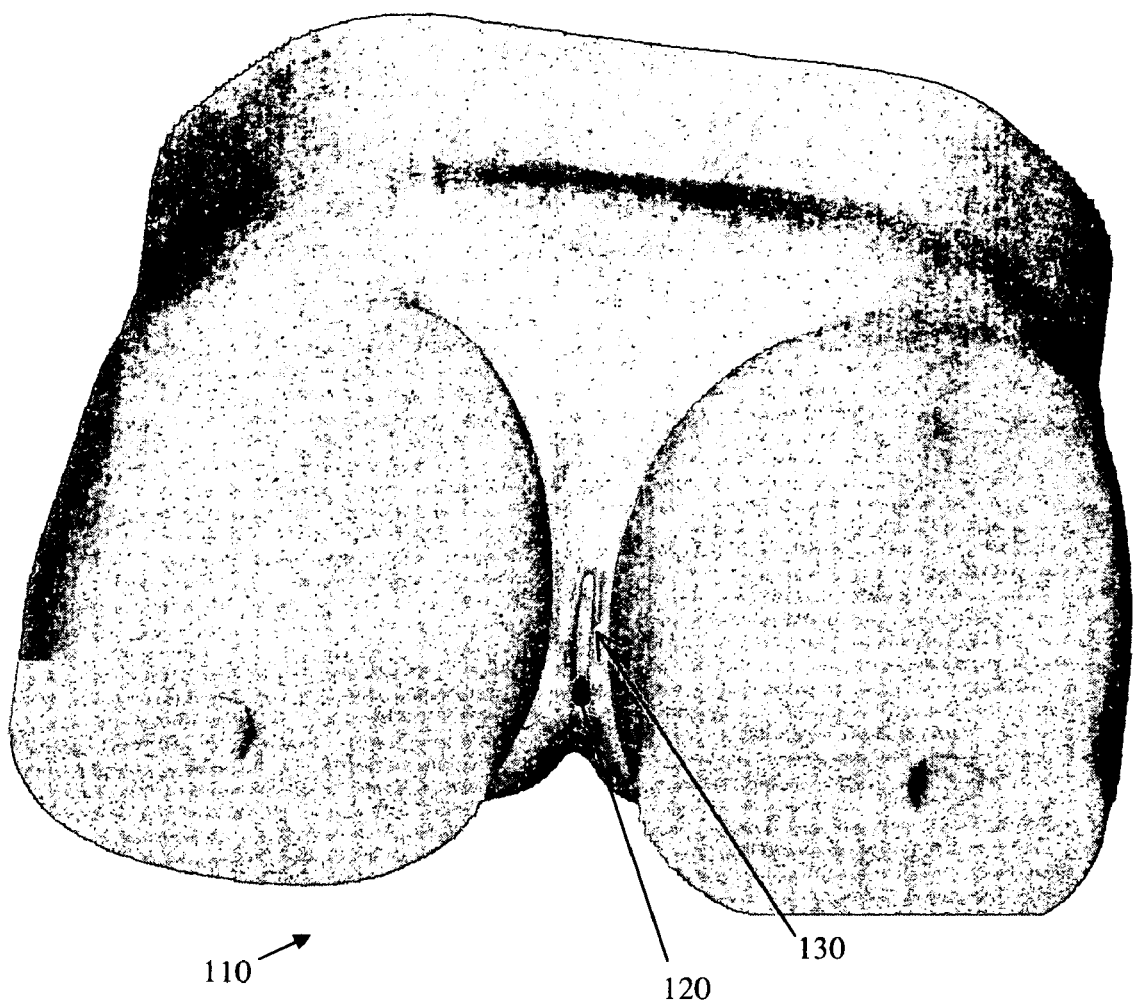
FIG. 9 is a schematic of a small amount of vaginal fluid specified at the virtual body model's vagina.

The initial conditions of the virtual body model and the virtual absorbent article model can be the same throughout the virtual body model and virtual absorbent article model or can vary spatially. Initially, the virtual body model and virtual absorbent article model can be specified to be devoid of fluid. Alternatively, prescribed amounts of fluid can be initially specified for particular locations of the virtual body model, the virtual absorbent article model, and any gap, if present, between the virtual body model and the virtual absorbent article model. For example, a small amount of vaginal fluid 120 can be specified at the woman's vagina 130, as shown in FIG. 9.

Material properties are input into the CFD software to describe the virtual body model, the fluid, and the virtual absorbent article model. The material properties of the virtual body model that can affect the fluid balance of the virtual absorbent article model include contact angle of the fluid on the body. Contact angle can be determined from tabulated data, using Young's Equation (Dullien (1992), Porous Media: Fluid Transport and Pore Structures, 2nd Edition, Academic Press), directly measured, or by using other means known in the art.

The material properties of the fluid that can affect the fluid balance of the virtual absorbent article model include, but are not limited to, the density, viscosity, and surface tension. Other parameters that may be of interest include temperature, heterogeneity, solids content, and additives to the fluid. Material properties that can be a function of strain can be assigned a value based on the strain computed from the virtual simulation of deformation of the virtual absorbent article model in proximity with the virtual body model. Output from the virtual simulation of deformation of the virtual absorbent article model in proximity with the virtual body model can be imported into the CFD software in portions that are partitioned based on the strain so as to simplify the process of assigning material properties in the CFD software. Without being bound by theory, material properties that may be a function of strain include, but are not limited to, porosity, saturated permeability, relative permeability, capillary pressure, irreducible fluid saturation, maximum fluid capacity, capillary pressure versus saturation relationship, relative permeability versus capillary pressure relationship, relative permeability versus saturation, and contact angle between the fluid and the materials comprising the virtual absorbent article.

Material properties of the virtual body model, the fluid, and the virtual absorbent article model can be gathered from actual bodies upon which an absorbent article is used and actual fluids to be acquired or dispensed by the absorbent article. For example, data on parameters selected from the group consisting of viscosity of fluids emanated from or applied to actual bodies, surface energy of actual bodies, surface energy of fluids emanated from or applied to actual bodies, and surface energy of actual absorbent articles used in proximity with a body can be collected. The virtual simulation of the fluid balance of the virtual absorbent article model in proximity with the virtual body model can comprise at least one parameter selected from the group consisting of a parameter describing the surface energy of the virtual body model, a parameter describing the surface energy of the virtual absorbent article model, and a parameter describing fluid surface energy. Properties of each component can be individually specified and the properties can vary spatially in any direction to be representative of the absorbent article modeled.

Constants specified for the virtual simulation of the fluid balance of the virtual absorbent article model include the gravitational constant.

Solver controls are input into the CFD software to control the numerical solutions implemented in the CFD software, as known in the art.

Output controls are also input into the CFD software. Output from the CFD software can comprise fluid distribution, fluid velocity distribution, fluid pressure distribution, volume of fluid absorbed by absorbent article, volume of fluid left on the body, and absorbent article fluid saturation as a function of time and location, all related to the virtual absorbent article model.

Absorbent article effectiveness of the virtual absorbent article model in proximity with the virtual body model can be determined by quantifying the amount of fluid on the virtual body model and on or in the virtual absorbent article model. If there is a gap between the virtual body model and the virtual absorbent article model, the quantity of fluid in the gap can also be an indicator of absorbent article effectiveness. For an absorbent article such as a sanitary napkin, the absorbent article preferably acquires all of the fluid emanated from or on the wearer's body. One measure of the absorbent article effectiveness can be the ratio of the volume of the fluid acquired by the virtual absorbent article model divided by the volume of the source of the fluid or the volume fluid emanated by the source of fluid. For absorbent articles such as sanitary napkins, a measure of the absorbent article effectiveness can be the stain size. Stain size can be characterized as the area of the body facing surface of the pad upon which fluid can be observed by the wearer upon removing the sanitary napkin from being arranged close to her body. Another measure of the absorbent article effectiveness of a sanitary napkin or pantiliner can be the volume of fluid in or on the undergarment, if present, as a fraction of the volume of the source of the fluid.

Absorbent article effectiveness of a dispensing virtual absorbent article model can be quantified, for example, as the ratio of volume of the fluid dispensed to the surface of the virtual body model to the total volume of fluid in the virtual absorbent article model prior to dispensing.

Figure 10:
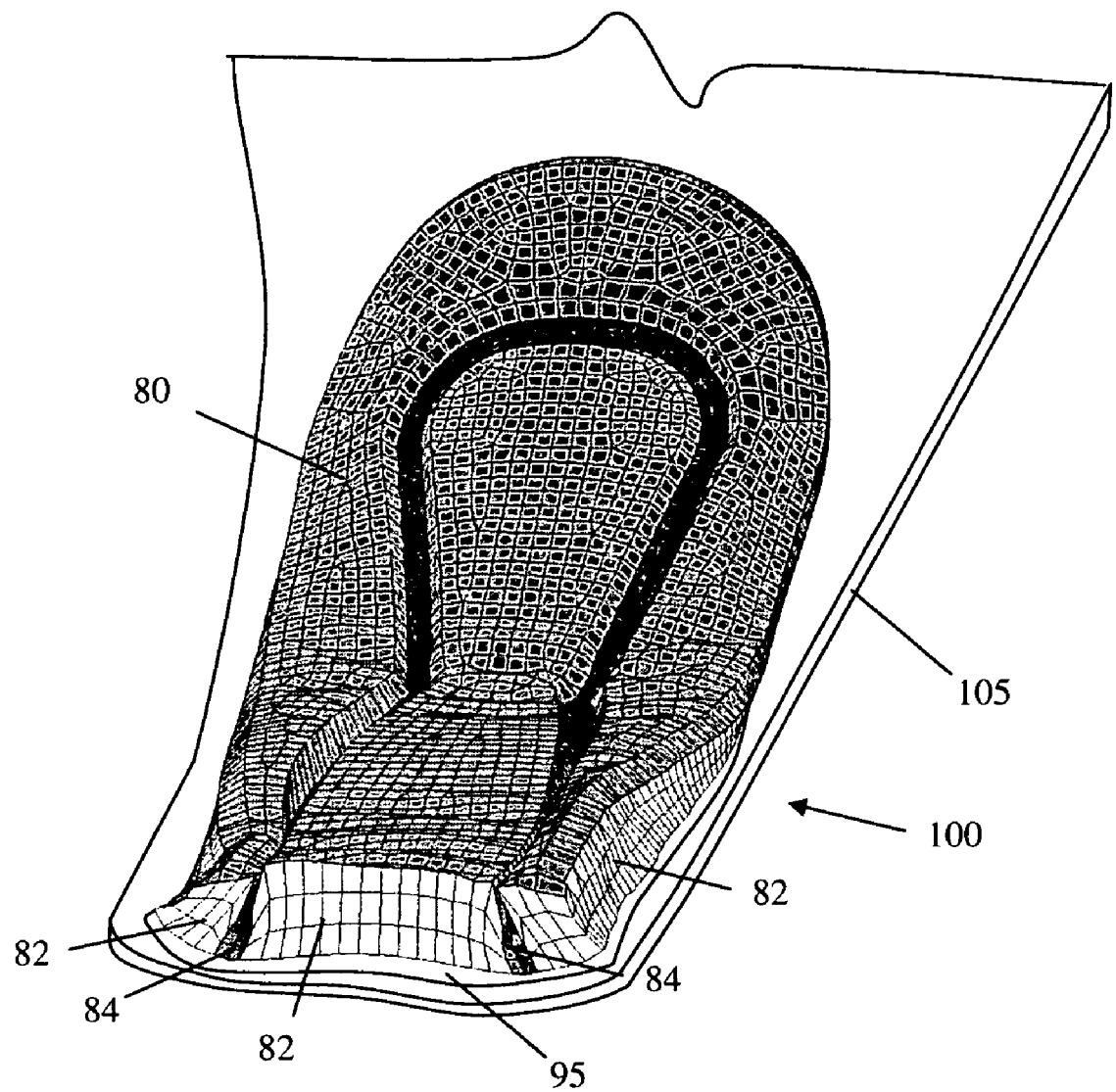
FIG. 10 is a schematic representation of a meshed virtual absorbent article model comprising more than one type of material.

Absorbent article effectiveness of absorbent articles worn in proximity to a human body can also be determined by quantifying the conformance and or comfort of the virtual absorbent article model to the virtual body model and the comfort of the virtual absorbent article model worn in proximity to the virtual body model. For absorbent articles such as sanitary napkins, as shown in FIG. 10, wherein the absorbent core 82 can be comprised of cellulosic material, changes in density of the materials can significantly affect the partially saturated fluid transport properties of the absorbent core 82. Similarly, movement by the virtual body model and virtual absorbent article model can result in a gap forming between the virtual body model and the virtual absorbent article model. A gap between the virtual body model and the virtual absorbent article model can impede transport of fluid from the surface of the virtual body model to the surface of the virtual absorbent article model.

Conformance and comfort analyses can be performed using a dynamic stress-strain analyzer, such as, for example, LS-DYNA® (Livermore Software Technology Corporation, Livermore, Calif.), ABAQUS® (ABAQUS Inc., Pawtucket, R.I.), ANSYS® (ANSYS Inc., Canonsburg, Pa.), or other suitable software. Any desired inputs, such as body mesh motion, absorbent article mesh motion, undergarment mesh motion, contact surfaces, garment mesh, and/or body mesh can be input to accomplish the analysis. The stress-strain analyzer supplies an output of deformed motion and corresponding forces, such as stress and strain. The forces include forces associated with deforming both the body and the garment. Garment deformation and the magnitude of the forces required to generate the deformation can be correlated to conformance and comfort.

Optionally, the simulation output, such as deformations and forces, can also be visualized using software such as LS-PREPOST® (Livermore Software Technology Corporation, Livermore, Calif.), HYPERVIEW® (Altair Engineering, Troy, Mich.), ENSIGHT® (Computational Engineering International, Apex, N.C.), or ABAQUS VIEWER® (ABAQUS Inc., Pawtucket, R.I.), for example. Visualization of the virtual absorbent article model as the virtual body model is manipulated can show in visual representation the deformation of the virtual absorbent article model. For example, a sanitary napkin can undergo buckling, twisting, and bunching during wear. Such deformation can be difficult, if not impossible, to watch in real time on a real person due to the practical constraints of such a system. However, such sanitary napkin conformance characteristics can be easily visualized and manipulated in the computer simulation. This capability significantly reduces the time and expense of designing better conforming absorbent articles such as sanitary napkins. Properties of materials can be changed as desired and input to a dynamic stress-strain analyzer to change the characteristics of the absorbent article, thereby providing for virtual prototyping of various designs.

The method disclosed herein can be used evaluate the effects of conformance of the virtual absorbent article model to the virtual body model on the fluid balance of the virtual absorbent article model. To evaluate the effects of conformance of the virtual absorbent article model to the virtual body model on the fluid balance of the virtual absorbent article model, the step of running a virtual simulation of deformation of the virtual absorbent article model in proximity with the virtual body model can be performed prior to the step of running a virtual simulation of the fluid balance of the virtual absorbent article model in proximity with the virtual body model. The virtual simulation of the fluid balance of the virtual absorbent article model in proximity with the virtual body model can be coupled to the virtual simulation of deformation of the virtual absorbent article model by passing the location of the absorbent article, the location of the body, and the spatial relationship between the absorbent article and body. In passing the location of the absorbent article, structural components, fluid handling components, or saturated components, can be passed. By "passing", it is meant that information is communicated from the fluid balance of the virtual absorbent article in proximity with the virtual body model to the virtual simulation of deformation of the virtual absorbent article model and/or from the virtual simulation of deformation of the virtual absorbent article model to the fluid balance of the virtual absorbent article in proximity with the virtual body model.

In a one embodiment, the data is passed using a stereolithography file, as discussed previously. By using this approach, the effects of deformation of the virtual absorbent article model and conformation of the virtual absorbent article model to the virtual body model on the fluid balance of the virtual absorbent article model can be evaluated. For instance, portions of the virtual absorbent article model may become more or less dense as a result of movement by the virtual body model. The same approach can be used for an absorbent article used to dispense a fluid.

To evaluate the effects of the fluid balance of the virtual absorbent article model on conformance and comfort of the virtual absorbent article model worn in proximity to the virtual body model, the step of running a virtual simulation of the fluid balance of the virtual absorbent article model worn in proximity to the virtual body model can be performed prior to the step of running a virtual simulation of deformation of the virtual absorbent article model worn in proximity to the virtual body model. "Conformance" is meant to describe how well the virtual absorbent article fits against the virtual body model and can be characterized by the distance between the virtual absorbent article model and the virtual body model in different areas of the virtual absorbent article. Comfort can be characterized by the stress or force transmitted between the virtual absorbent article model and the virtual body model or the magnitude of deformation of the virtual body model caused by the existence of the virtual absorbent article model in proximity with the virtual body model.

The virtual simulation of deformation of the virtual absorbent article model can be coupled to the virtual simulation of the fluid balance of the virtual absorbent article model in proximity with the virtual body model by passing the spatial location of the fluid within the absorbent article upon completion of the virtual simulation of the fluid balance. By using this approach, the effects of the fluid balance of the virtual absorbent article model on conformance of the virtual absorbent article model with the virtual body model can be determined. The effects of the fluid balance of the virtual absorbent article model on comfort of the virtual absorbent article model can also be determined. For instance, as portions of the virtual absorbent article model become wetted or releases fluid, mechanical properties of portions of the virtual absorbent article such as the density and modulus may change. In another instance, as an absorbent article comprising swelling agents, such as super absorbent polymers (e.g., absorbent gelling materials), the density of the absorbent article may decrease when wetted (i.e., the absorbent article swells). Some materials used in absorbent articles collapse when wetted, which results in an increase in density. Changes in the mechanical properties of the virtual absorbent article can impact the conformation of the virtual absorbent article to the virtual body model when the virtual body model and virtual absorbent article model move relative to one another.

If the step of running a virtual simulation of the fluid balance of the virtual absorbent article model worn in proximity to the virtual body model is performed prior to the step of running a virtual simulation of deformation of the virtual absorbent article model worn in proximity to the virtual body model, one result from the virtual simulation of the fluid balance that can be of interest to designers and modelers of absorbent articles is the fluid saturation of components of the virtual absorbent article model. A post-processor, such as ENSIGHT, for visualizing results from the virtual simulation of the fluid balance of the virtual absorbent article model can be used to capture an image of the fluid saturation of the virtual absorbent article model. The image can be recorded in JPEG, PNG, GIF, bitmap, or any other similar form. An image of the fluid saturation can be created for each component of the virtual absorbent article model. For instance, an image of the fluid saturation of each layer of an absorbent article can be created. For a virtual absorbent article model of a sanitary napkin, an image of the fluid saturation of the topsheet 80 alone, absorbent core 82 alone, backsheet 95 alone, and any other distinct component or portion of the virtual absorbent article model can be created.

The image of the fluid saturation of a component of the virtual absorbent article model can be imported into a pre-processor, such as LS-PREPOST® (Livermore Software Technology Corporation, Livermore, Calif.), to assist the modeler with assigning mechanical properties of components of the virtual absorbent article model. For instance, the image of the fluid saturation of a component of the virtual absorbent article model can be used as a background of the view port in the pre-processor. The mesh for the virtual simulation of deformation of the virtual absorbent article model can then be overlaid on the image of the fluid saturation of a component of the virtual absorbent article model, scaled and oriented so that that the mesh for the virtual simulation of deformation of the virtual absorbent article model is coordinated with the image of the fluid saturation, and individual material properties of the virtual absorbent article model can be assigned. For example, the modulus of components of absorbent articles can vary as a function of saturation and different parts of components of the virtual absorbent article model can be assigned a different modulus, depending on the saturation. Each component of the virtual absorbent article model can be pre-processed independent of other components.

The steps of running a virtual simulation of deformation of the virtual absorbent article model in proximity with the virtual body model and running a virtual simulation of the fluid balance of the virtual absorbent article model in proximity with the virtual body model can be advanced alternately incrementally in time and in concert with one another. An example of advancing in concert is to start at a time of zero, advance the virtual simulation of deformation of the virtual absorbent article model in proximity with the virtual body model by an increment in time (e.g., 0.1 s), then advance the virtual simulation of the fluid balance of the virtual absorbent article model in proximity with the virtual body model by an increment in time (e.g., 0.1 s), then advance the virtual simulation of deformation of the virtual absorbent article model in proximity with the virtual body model by another increment in time (e.g., 0.1 s), and then advance the virtual simulation of the fluid balance of the virtual absorbent article model in proximity with the virtual body model by another increment in time (e.g., 0.1 s), thereby stepwise advancing in time. An element of this approach is that time lag between the virtual simulation of the fluid balance of the virtual absorbent article model in proximity with the virtual body model and the virtual simulation of the fluid balance of the virtual absorbent article model in proximity with the virtual body model are out of phase by only a small amount such that the impacts of the time lag on results from the simulations are small. This approach can provide information about how the fluid balance of the virtual absorbent article model and conformance of the virtual absorbent article model to the virtual body model interact with one another over time. The same approach can be used for an absorbent article used to dispense a fluid.

To improve numerical stability of virtual simulation of deformation of the virtual absorbent article model, the strain history of portions of the virtual absorbent article model that change in saturation (i.e., transition from dry to partially saturated or from partially saturated to dry) can be ignored. The time increment by which the virtual simulation of deformation of the virtual absorbent article model and the virtual simulation of the fluid balance of the virtual absorbent article model are advanced should be small enough such that the incremental changes in the properties of the absorbent article are small to ensure numerical stability of the virtual simulation of deformation of the virtual absorbent article model and the virtual simulation of the fluid balance of the virtual absorbent article model.

The virtual simulation of the fluid balance of the virtual absorbent article model in proximity with the virtual body model can comprise at least one parameter that is variable as a function of strain of the virtual absorbent article model. For instance, the parameter that can be variable as a function of strain of the virtual absorbent article model can be selected from the group consisting of porosity, saturated permeability, relative permeability, capillary pressure, irreducible fluid saturation, maximum fluid capacity, capillary pressure versus saturation relationship, relative permeability versus capillary pressure relationship, relative permeability versus saturation relationship, and contact angle between the fluid and the virtual materials comprising the virtual absorbent article. Without being bound by theory, it is thought that these parameters can vary as a function of strain of the virtual absorbent article model.

Similarly, the virtual simulation of deformation of the virtual absorbent article model in proximity with the virtual body model can comprise at least one parameter that is variable as a function of the fluid balance of portions of the virtual absorbent article model. The parameter that can be variable as a function of the fluid balance of portions of the virtual absorbent article model can be selected from the group consisting of modulus, density, plasticity behavior, and Poisson's ratio. Without being bound by theory, it is thought that these parameters may vary as a function of saturation.

The virtual simulation of deformation of the virtual absorbent article model in proximity to the virtual body model can comprise at least one parameter that is variable as a function of strain of the virtual absorbent article model. For instance, the stress-strain relationships for some absorbent materials are known to be non-linear. Thus, the modulus of some absorbent materials can be a function of strain of the absorbent material.

Absorbent articles such as diapers, incontinence products, and sanitary napkins are commonly comprised of multiple layers of materials. For instance, a sanitary napkin may be comprised of a topsheet 80, a backsheet 95, and an absorbent core 82 disposed between the topsheet 80 and backsheet 95. To evaluate the absorbent article effectiveness of an absorbent article comprised of more than one layer of material, the virtual absorbent article model can be comprised of more than one type of virtual absorbent material, as shown in FIG. 10. FIG. 10 is a representation of a deformed sanitary napkin 100 that is cut in half, the rear half of the deformed sanitary napkin 100 being shown. The sanitary napkin 100 shown in FIG. 10 comprises a topsheet 80 (shaded light grey), an absorbent core 82, channels 84 (shaded darker grey), and backsheet 95. Channels can be portions of the absorbent core 82 rendered denser or less dense than adjacent non-rendered portions. The virtual absorbent article model can represent an absorbent article comprised of a topsheet 80, a backsheet 95, and an absorbent core 82 disposed between the topsheet 80 and backsheet. The virtual absorbent article model can optionally comprise a virtual undergarment model 105. The virtual absorbent article model can also include elements representative of additives such as superabsorbents. Superabsorbents are commonly added to absorbent articles to increase the absorbency of the absorbent article. Superabsorbents include, but are not limited to, absorbent gelling material (AGM), as known in the art, and chitosan.

The virtual absorbent article can be representative of an absorbent article selected from the group consisting of sanitary napkins, pantiliners, incontinent pads, tampons, interlabial pads, diapers, and breast pads. The virtual absorbent article can be representative of an absorbent article selected from the group consisting of feminine wipes, diaper wipes, body wipes, toilet tissue, facial tissue, wound dressings, handkerchiefs, household wipes, window wipes, bathroom wipes, surface wipes, countertop wipes, and floor wipes.

In one embodiment of the method, the virtual simulation of the fluid balance of the virtual absorbent article model in proximity to the virtual body model comprises a virtual body model, wherein the virtual simulation of the fluid balance of the virtual absorbent article model comprises at least one parameter describing the spatial relationship between the virtual absorbent article model and the virtual body model. In this embodiment, the effect of the spacing between virtual body model and the virtual absorbent article model on fluid acquisition can be identified. For instance, the virtual simulation of deformation of the virtual absorbent article model in proximity to the virtual body model can be performed to determine the geometry of the virtual body model and the virtual absorbent article model in use as well as the spatial relationship between the virtual body model and the virtual absorbent article model. In the virtual simulation of the fluid balance of a virtual absorbent article model in proximity to the virtual body model, the virtual body model can be prescribed to move relative to the virtual absorbent article model. For instance, the virtual absorbent article model and virtual body model can move relative to one another in one or more of the following modes: shear, normal, cyclically, and variable rate in shear and or normal. That is, the at least one parameter describing the spatial relationship between the virtual absorbent article model and the virtual body model can vary. Using this approach, the effect of movement of the virtual absorbent article model relative to the virtual body model on the fluid balance of the virtual absorbent article model can be identified.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for determining absorbent article effectiveness of a virtual absorbent article, said method comprising the steps of:
    providing a virtual body model that represents a physical body;
    providing a virtual absorbent article model that represents a physical absorbent article;
    providing virtual simulation software;
    running a virtual simulation of deformation of said virtual absorbent article model in proximity with said virtual body model;
    running a virtual simulation of fluid balance of said virtual absorbent article model in proximity with said virtual body model that illustrates how fluid is transferred from the virtual body to the virtual absorbent article, and into the virtual absorbent article using computational fluid dynamics;
    coupling said virtual simulation of deformation of said virtual absorbent article model and said virtual simulation of the fluid balance of said virtual absorbent article model; and
    determining absorbent article effectiveness of said virtual absorbent article model in proximity with said virtual body model.

2. The method according to claim 1, wherein the step of running a virtual simulation of deformation of said virtual absorbent article model in proximity with said virtual body model is performed prior to the step of running said virtual simulation of the fluid balance of said virtual absorbent article model in proximity with said virtual body model that illustrates how fluid is transferred from the virtual body to the virtual absorbent article, and into the virtual absorbent article using computational fluid dynamics.

3. The method according to claim 1, wherein the step of running a virtual simulation of the fluid balance of said virtual absorbent article model in proximity with said virtual body model that illustrates how fluid is transferred from the virtual body to the virtual absorbent article, and into the virtual absorbent article using computational fluid dynamics is performed prior to the step of running a virtual simulation of deformation of said virtual absorbent article model in proximity with said virtual body model.

4. The method according to claim 1, wherein the steps of:
running a virtual simulation of deformation of said virtual absorbent article model in proximity with said virtual body model and running a virtual simulation of the fluid balance of said virtual absorbent article model in proximity with said virtual body model that illustrates how fluid is transferred from the virtual body to the virtual absorbent article, and into the virtual absorbent article using computational fluid dynamics are alternately advanced incrementally in time.

5. The method according to claim 1, wherein said virtual simulation of the fluid balance of said virtual absorbent article model in proximity with said virtual body model that illustrates how fluid is transferred from the virtual body to the virtual absorbent article, and into the virtual absorbent article using computational fluid dynamics comprises at least one parameter selected from the group consisting of a parameter describing the surface energy of said virtual body model, a parameter describing surface energy of said virtual absorbent article model, and a parameter describing fluid surface energy.

6. The method according to claim 1, wherein said virtual simulation of the fluid balance of said virtual absorbent article model in proximity with said virtual body model that illustrates how fluid is transferred from the virtual body to the virtual absorbent article, and into the virtual absorbent article using computational fluid dynamics comprises at least one parameter that is variable as a function of strain of said virtual absorbent article.

7. The method according to claim 6, wherein said parameter that is variable as a function of strain of said virtual absorbent article is selected from the group consisting of porosity, saturated permeability, relative permeability, capillary pressure, irreducible fluid saturation, maximum fluid capacity, capillary pressure versus saturation relationship, relative permeability versus capillary pressure relationship, relative permeability versus saturation relationship, and contact angle between the fluid and the virtual materials comprising the virtual absorbent article.

8. The method according to claim 1, wherein said virtual simulation of deformation of said virtual absorbent article model in proximity with said virtual body model comprises at least one parameter that is variable as a function of the fluid balance of portions of said virtual absorbent article.

9. The method according to claim 8, wherein said parameter that is variable as a function of the fluid balance of portions of said virtual absorbent article is selected from the group consisting of modulus, density, plasticity behavior, and Poisson ratio.

10. The method according to claim 1, wherein said virtual simulation of deformation of said virtual absorbent article model in proximity with said virtual body model comprises at least one parameter that is variable as a function of strain of said virtual absorbent article.

11. The method according to claim 10, wherein said parameter that is variable as a function of strain of said virtual absorbent article is modulus.

12. The method according to claim 1, wherein said virtual absorbent article model is comprised of more than one type of virtual absorbent material.

13. The method according to claim 1, wherein said virtual absorbent article model is comprised of a virtual topsheet, a virtual backsheet, and a virtual absorbent core disposed between said virtual topsheet and said virtual backsheet.

14. The method according to claim 1, wherein said virtual absorbent article model further comprises a virtual undergarment model.

15. The method according to claim 1, wherein said virtual simulation of the fluid balance of said virtual absorbent article model in proximity with said virtual body model that illustrates how fluid is transferred from the virtual body to the virtual absorbent article, and into the virtual absorbent article using computational fluid dynamics comprises a virtual body model, wherein said virtual simulation of the fluid balance of said virtual absorbent article comprises at least one parameter describing the spatial relationship between said virtual absorbent article and said virtual body model.

16. The method according to claim 15, wherein said at least one parameter describing the spatial relationship between said virtual absorbent article and said virtual body model varies.

17. The method according to claim 1, wherein said virtual absorbent article model is representative of an absorbent article selected from the group consisting of sanitary napkins, pantiliners, incontinent pads, tampons, interlabial pads, diapers, and breast pads.

18. The method according to claim 1, wherein said virtual absorbent article model is representative of an absorbent article selected from the group consisting of feminine wipes, diaper wipes, body wipes, toilet tissue, facial tissue, wound dressings, handkerchiefs, household wipes, window wipes, bathroom wipes, surface wipes, countertop wipes, and floor wipes.

19. The method according to claim 1, wherein said virtual body model represents a human.

20. The method according to claim 1, wherein said virtual body model represents a household surface.

* * * * *